Figure 6:
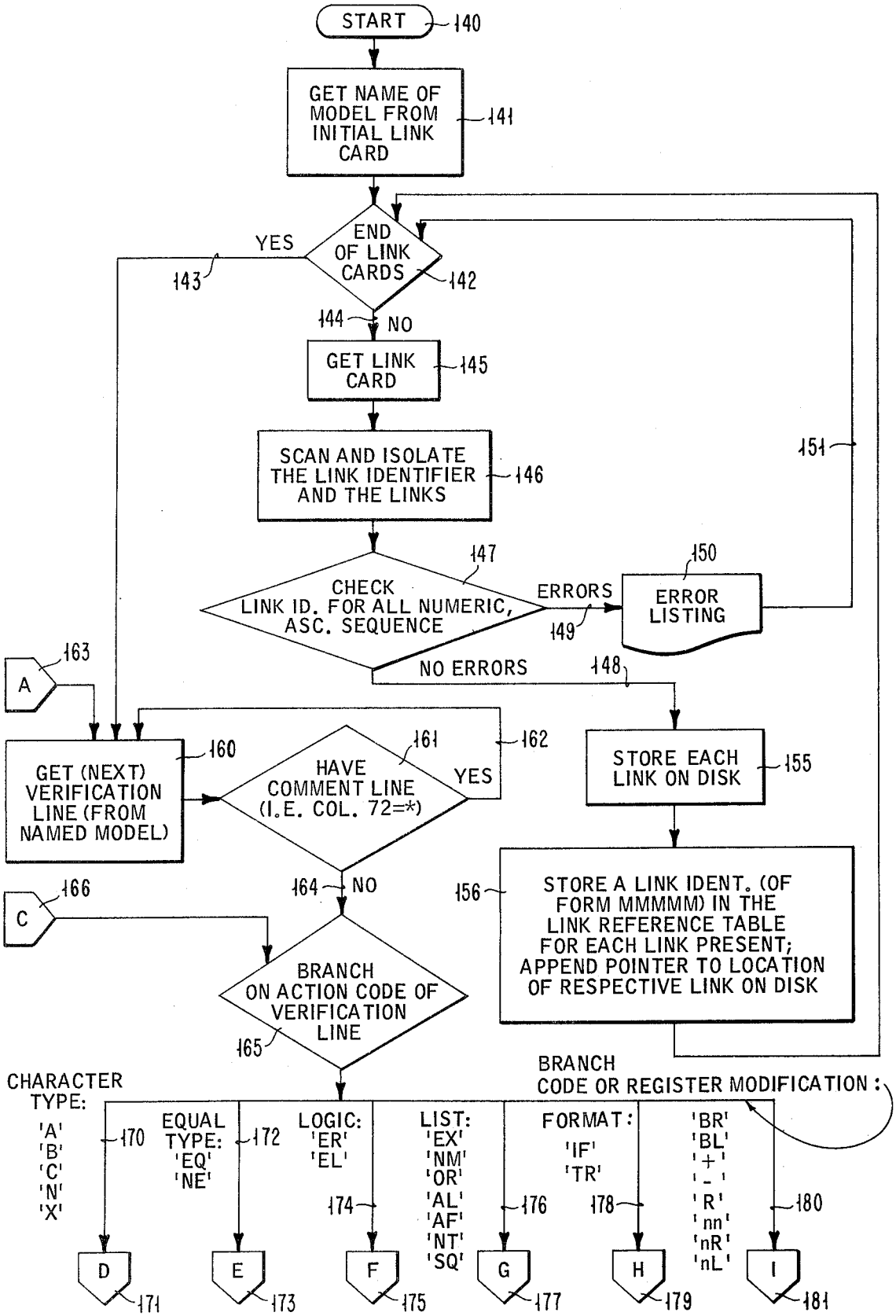
Figure 7A:
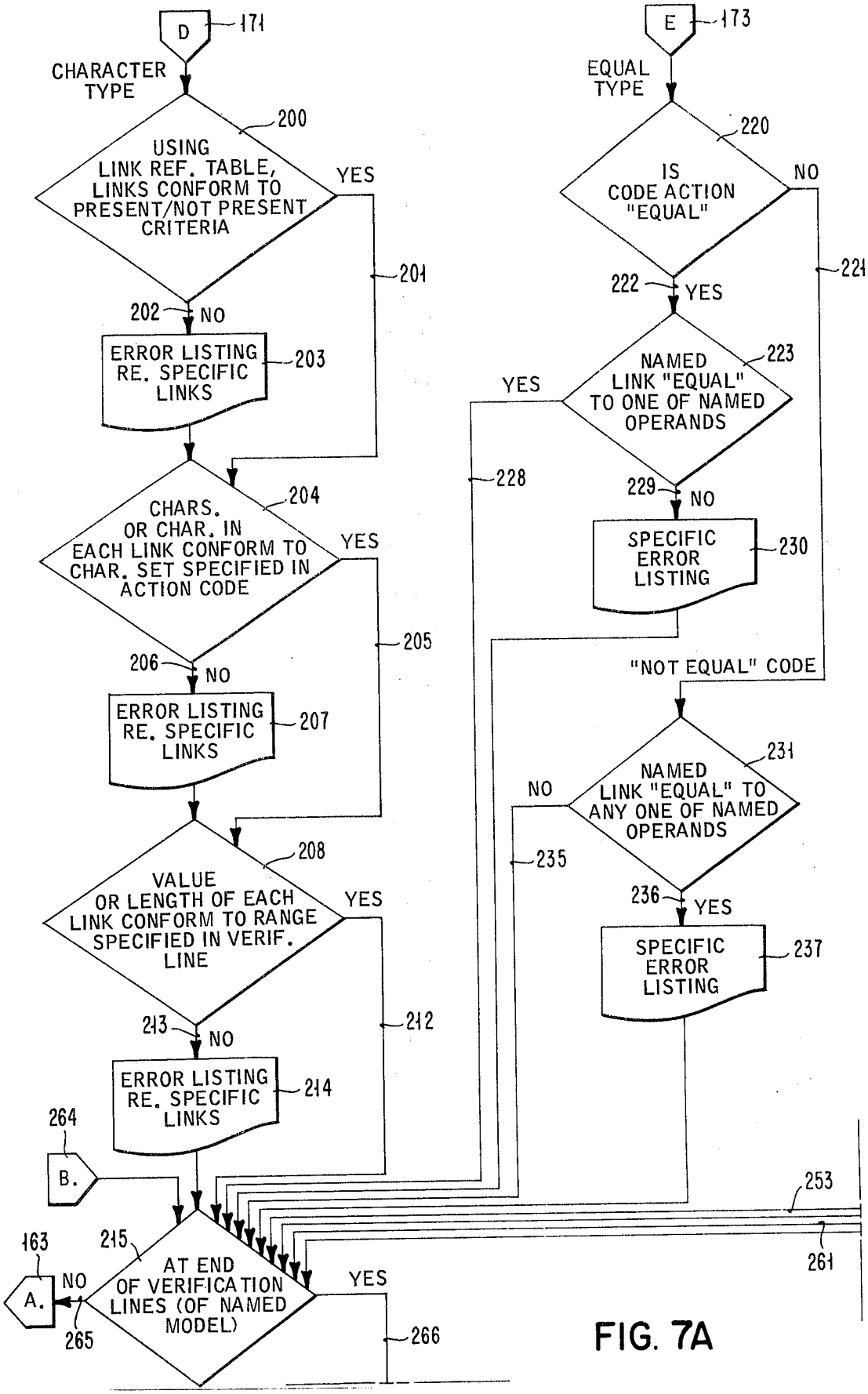
Figure 7B:
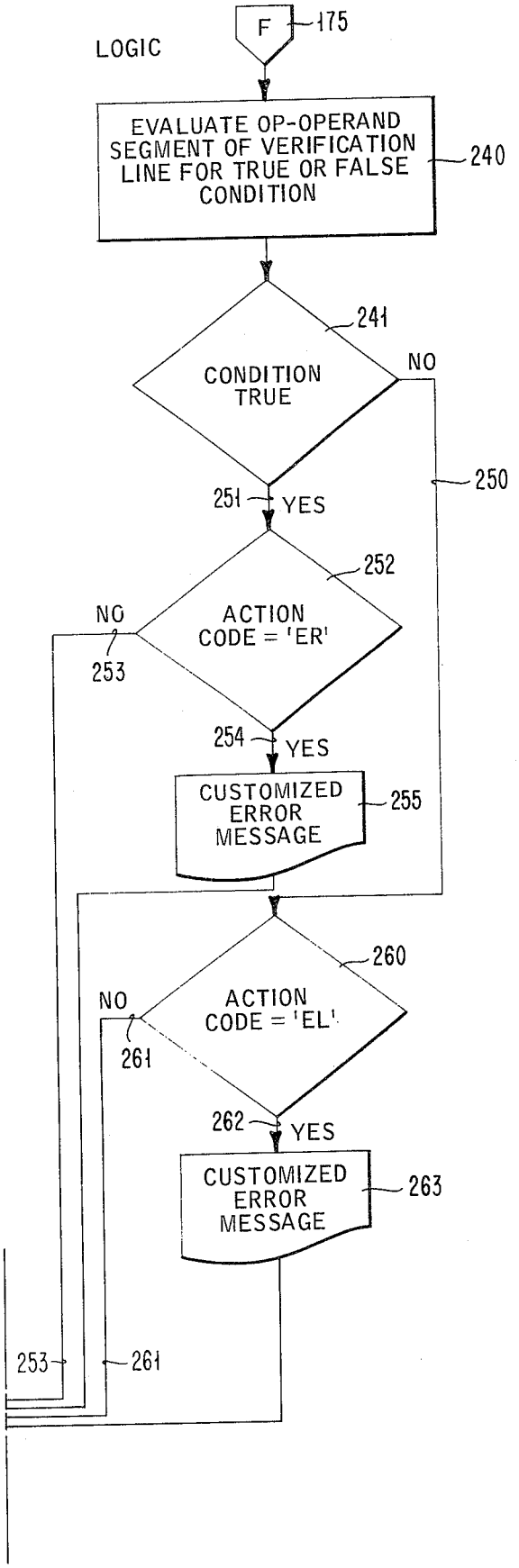
Figure 7C:
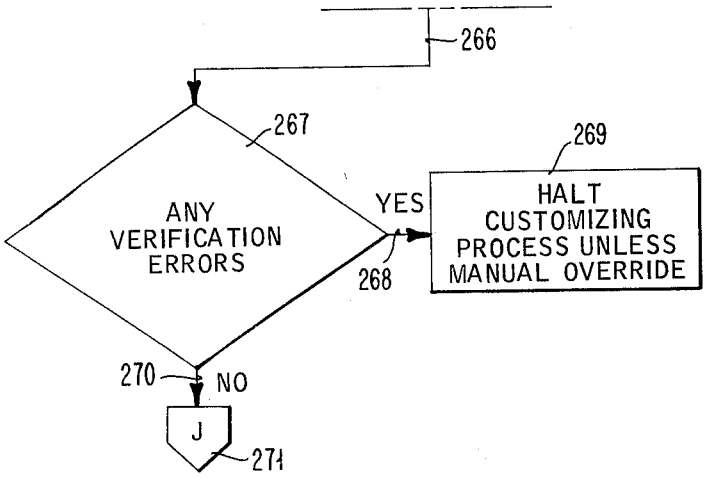
Figure 7D:
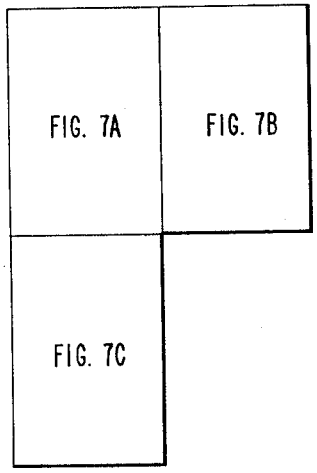
Figure 8C:
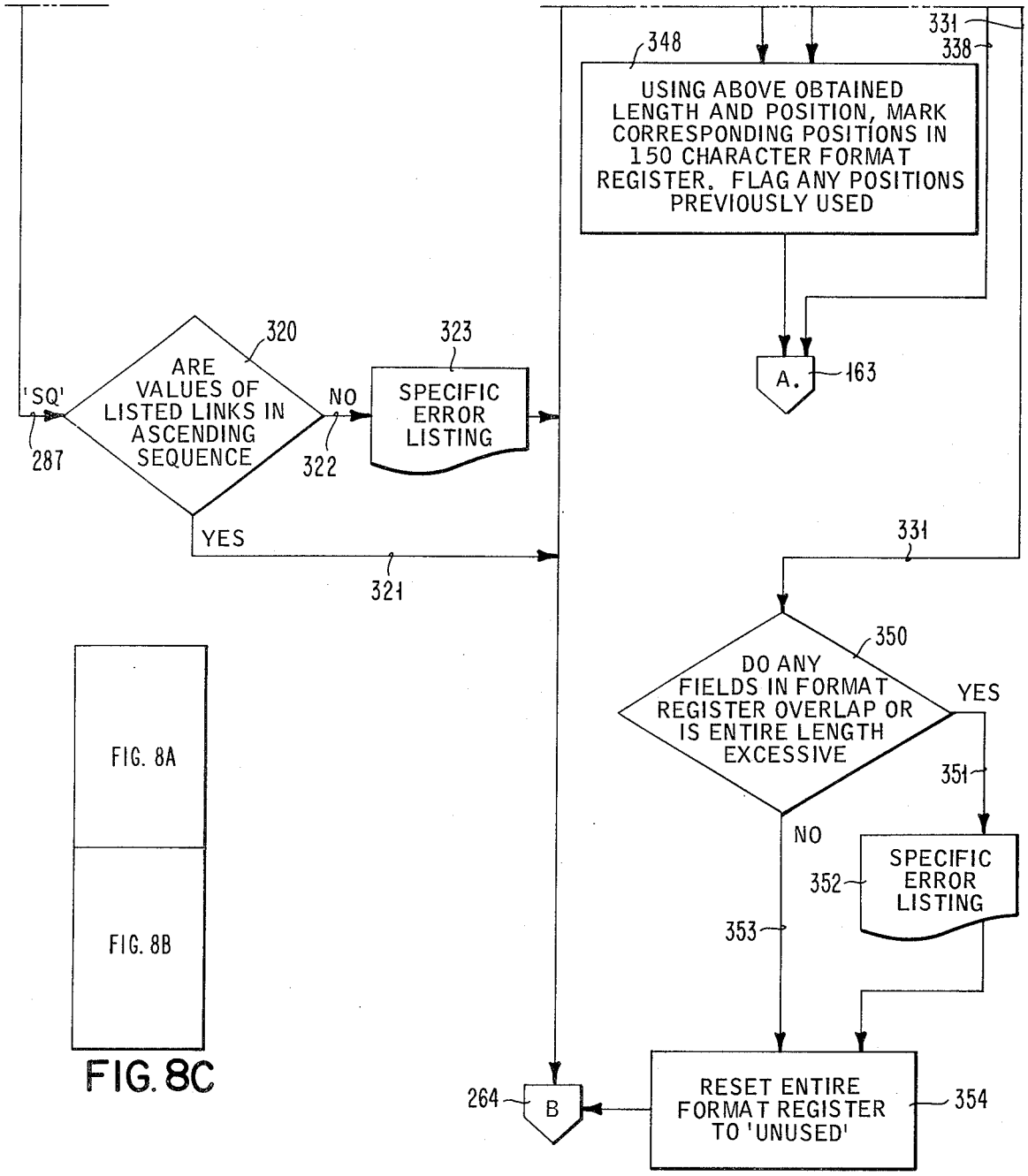
Figure 8A:
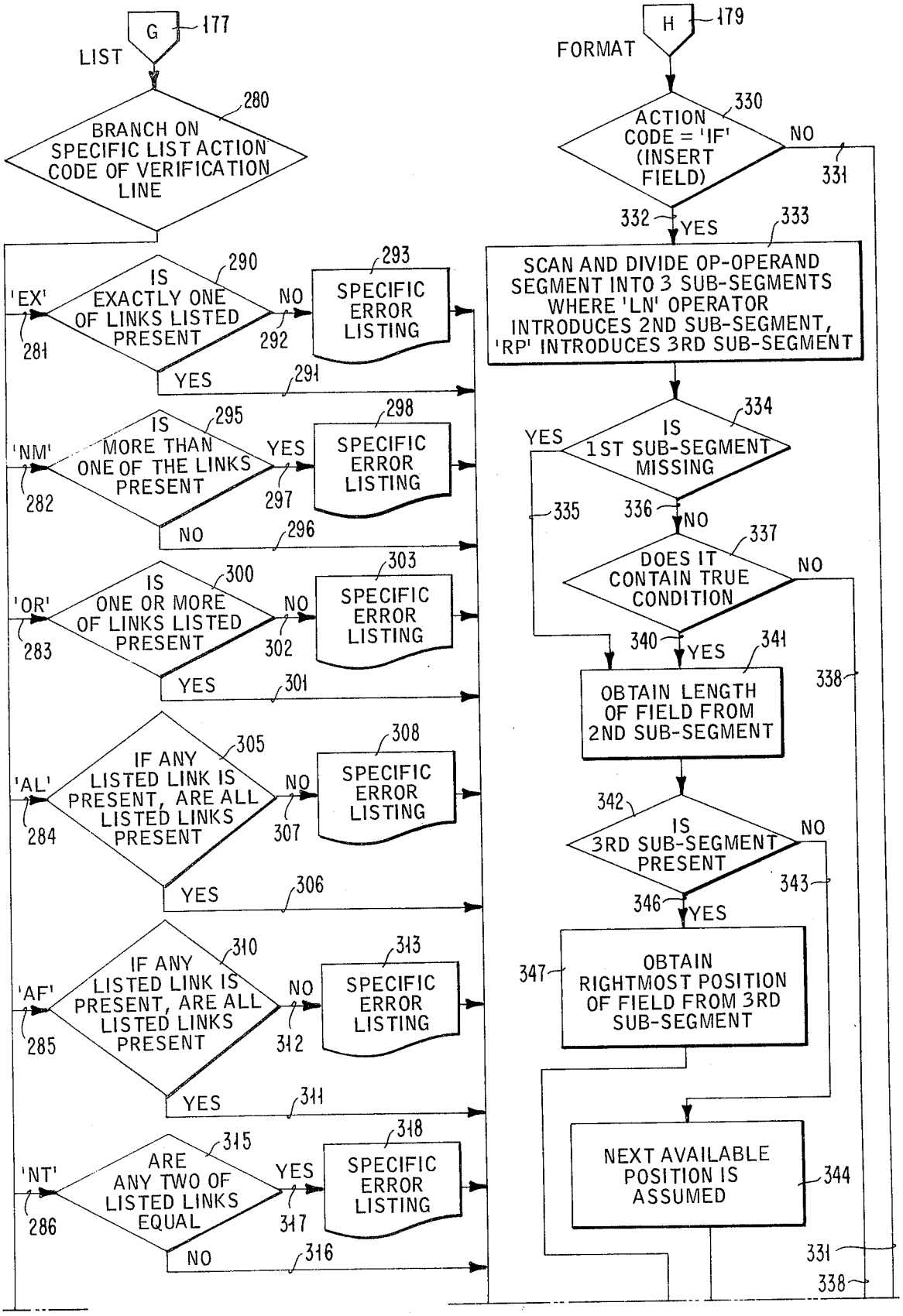
Figure 9:
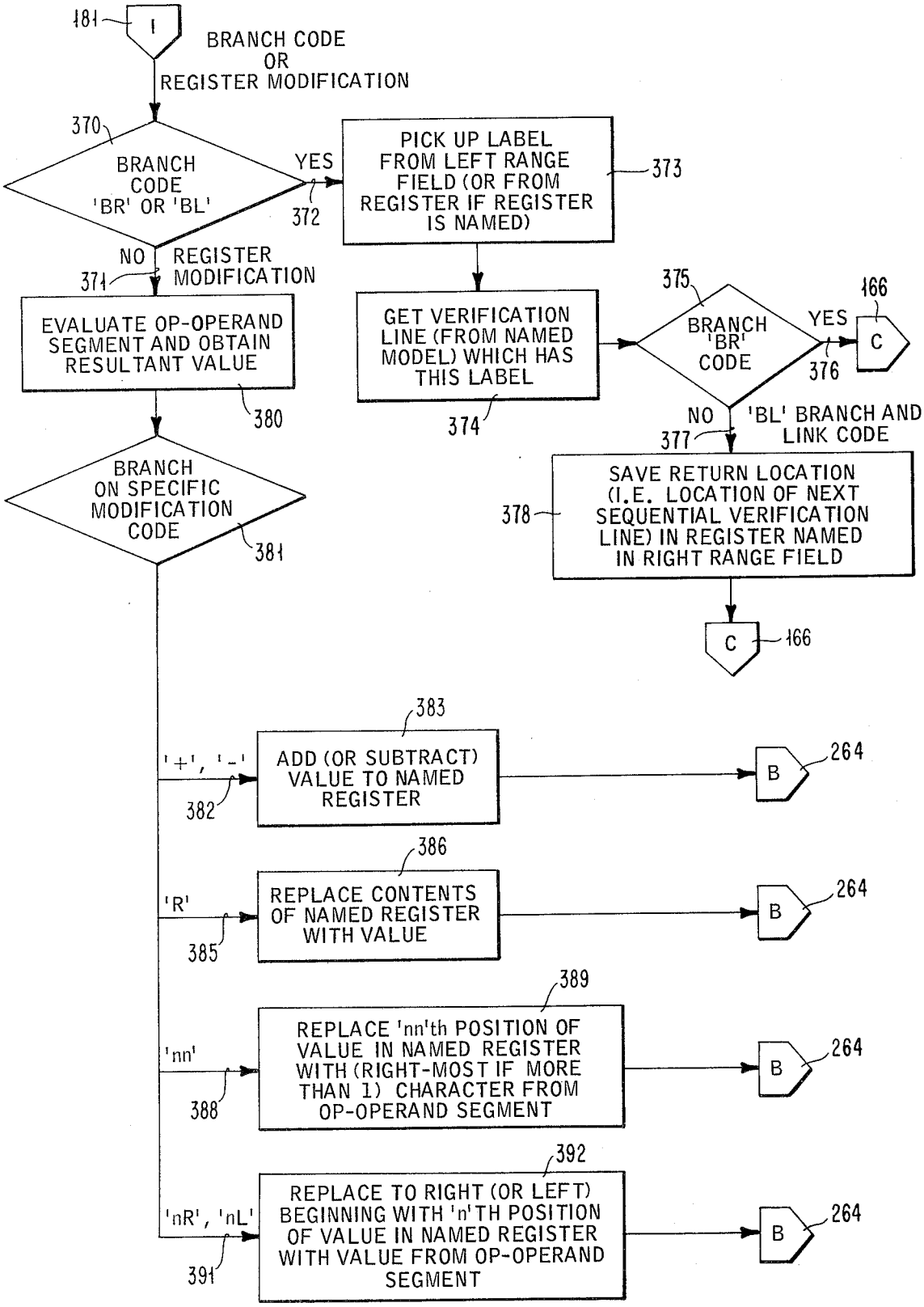
Figure 10:
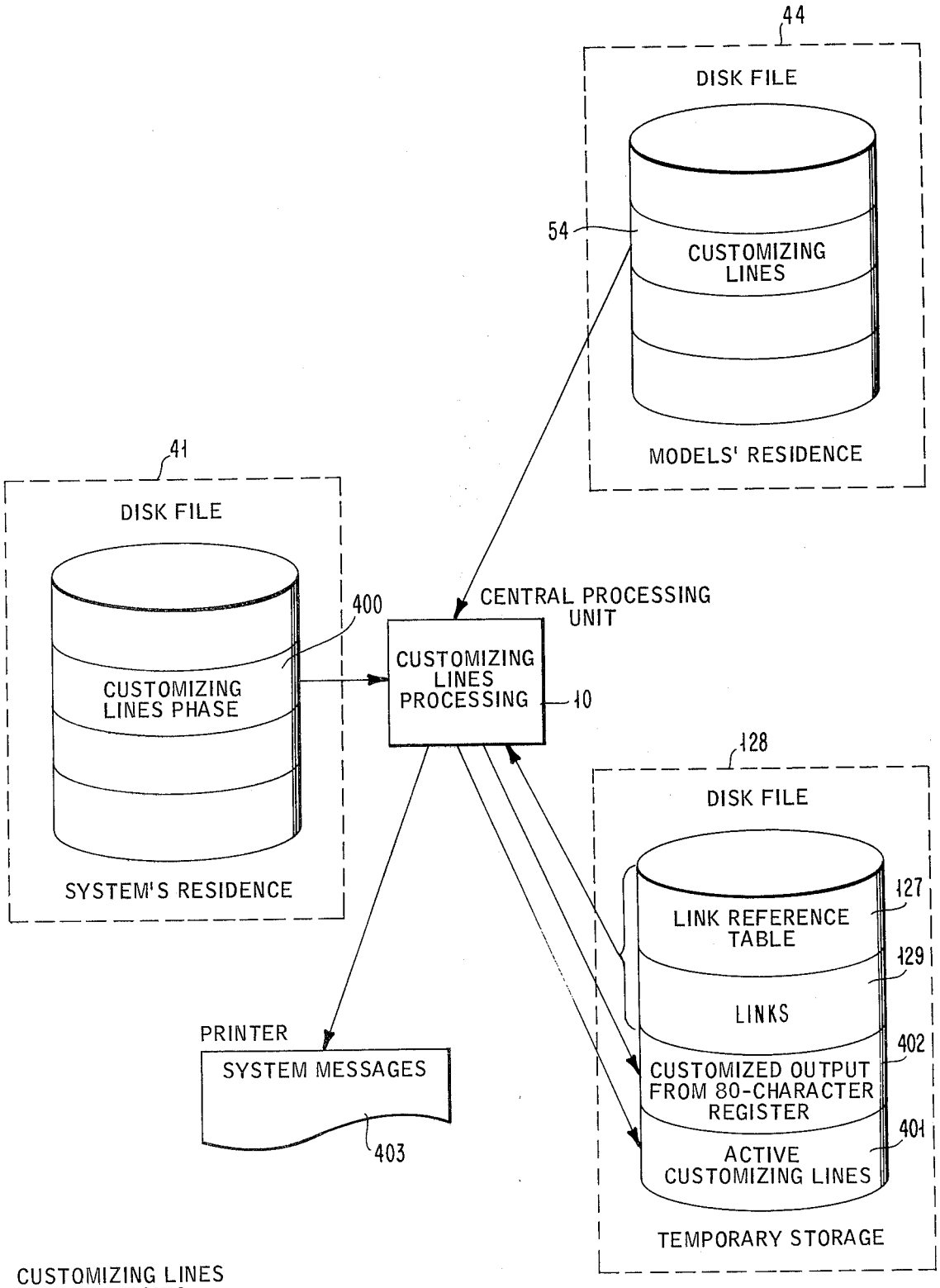
Figure 11:
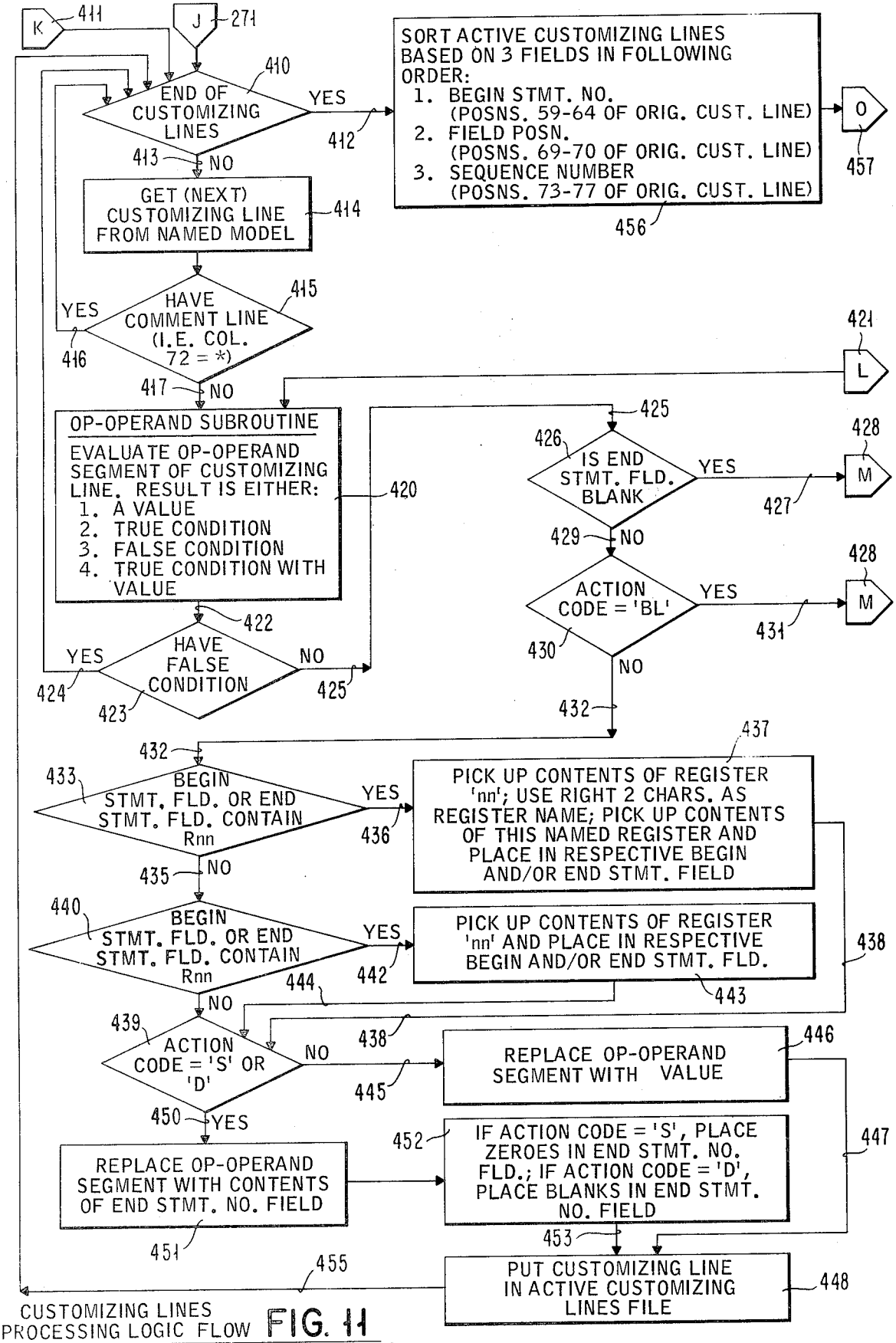
Figure 12:
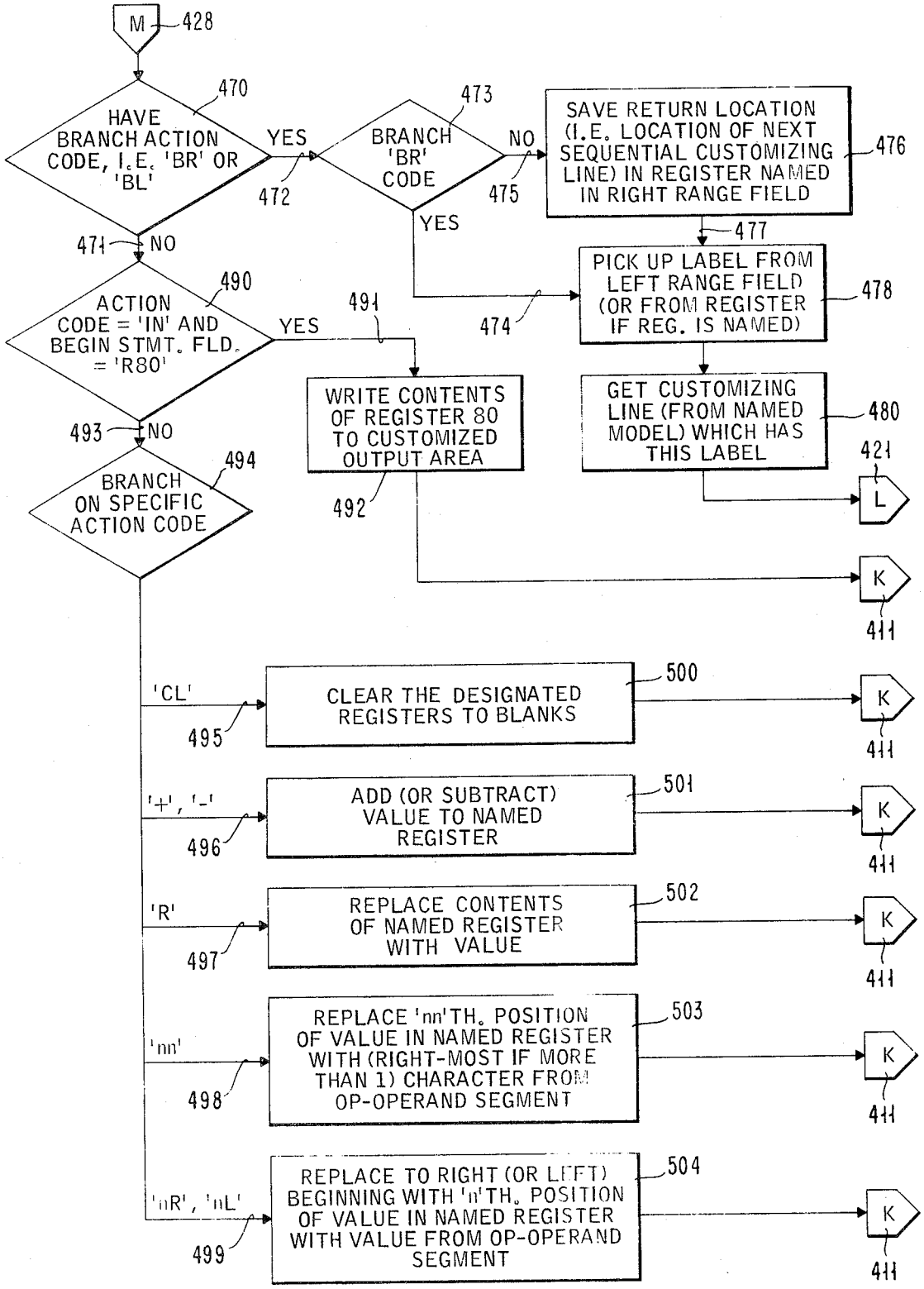
Figure 13A:
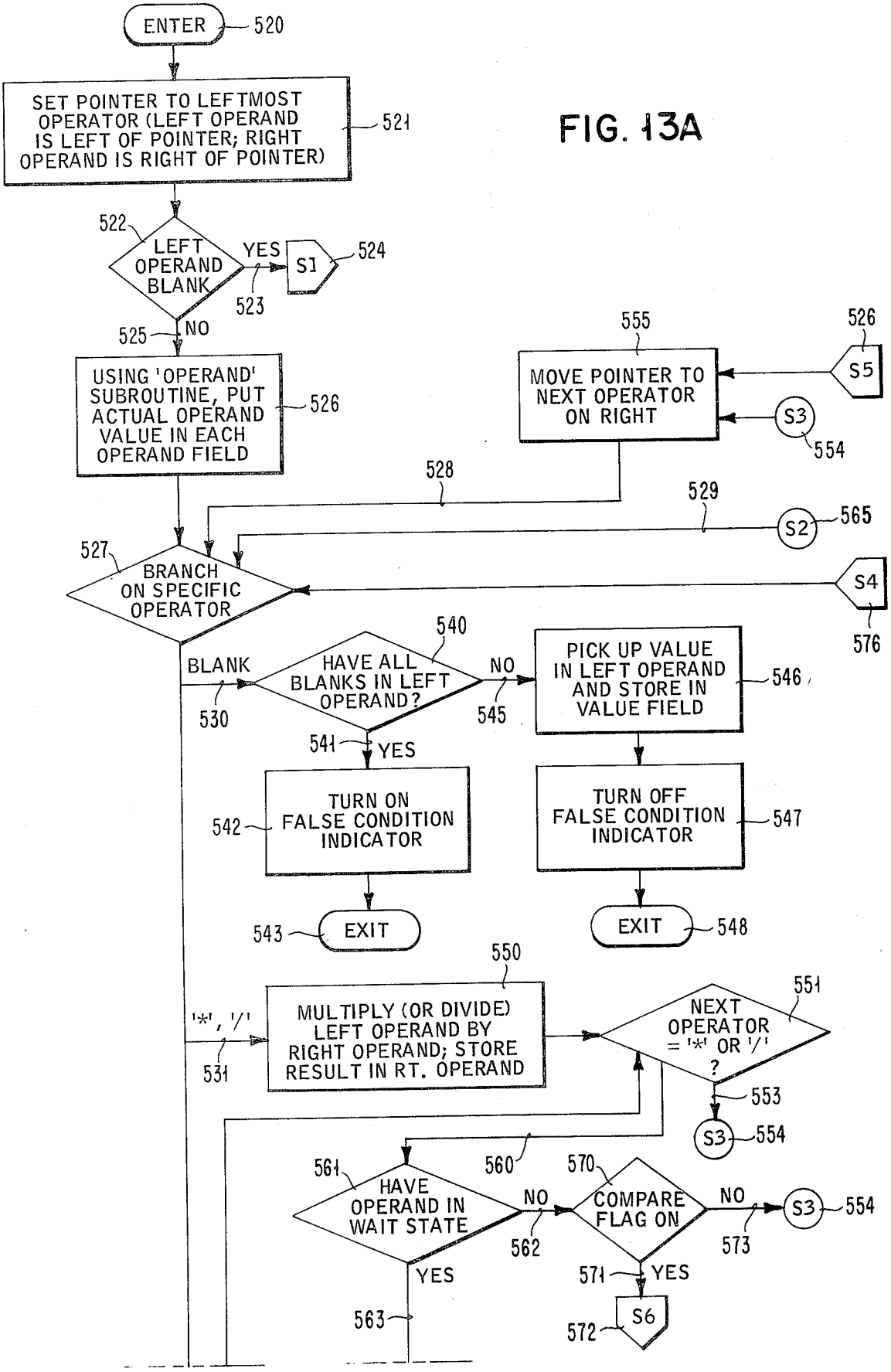
Figures 13B, 13C:
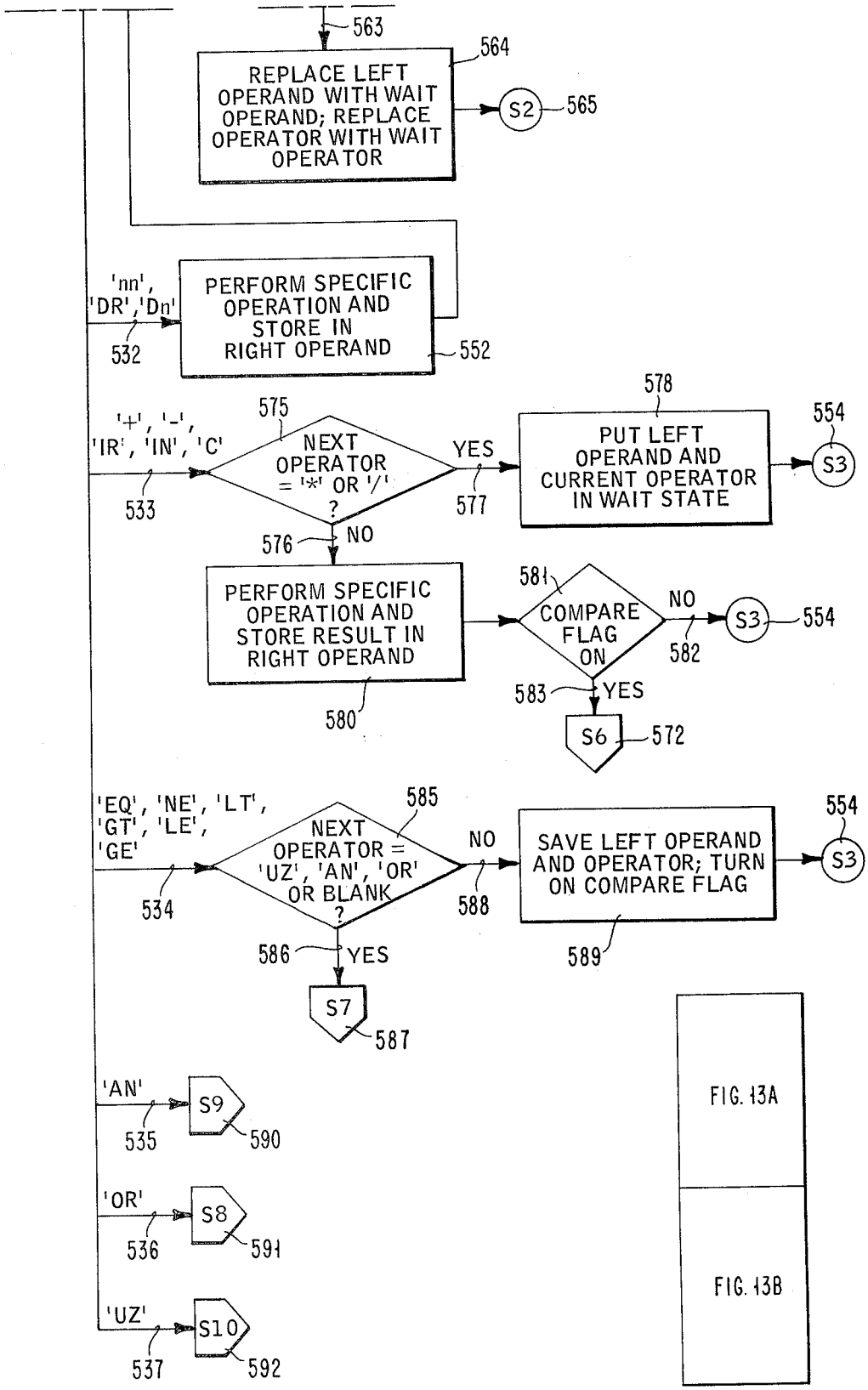
Figure 14A:
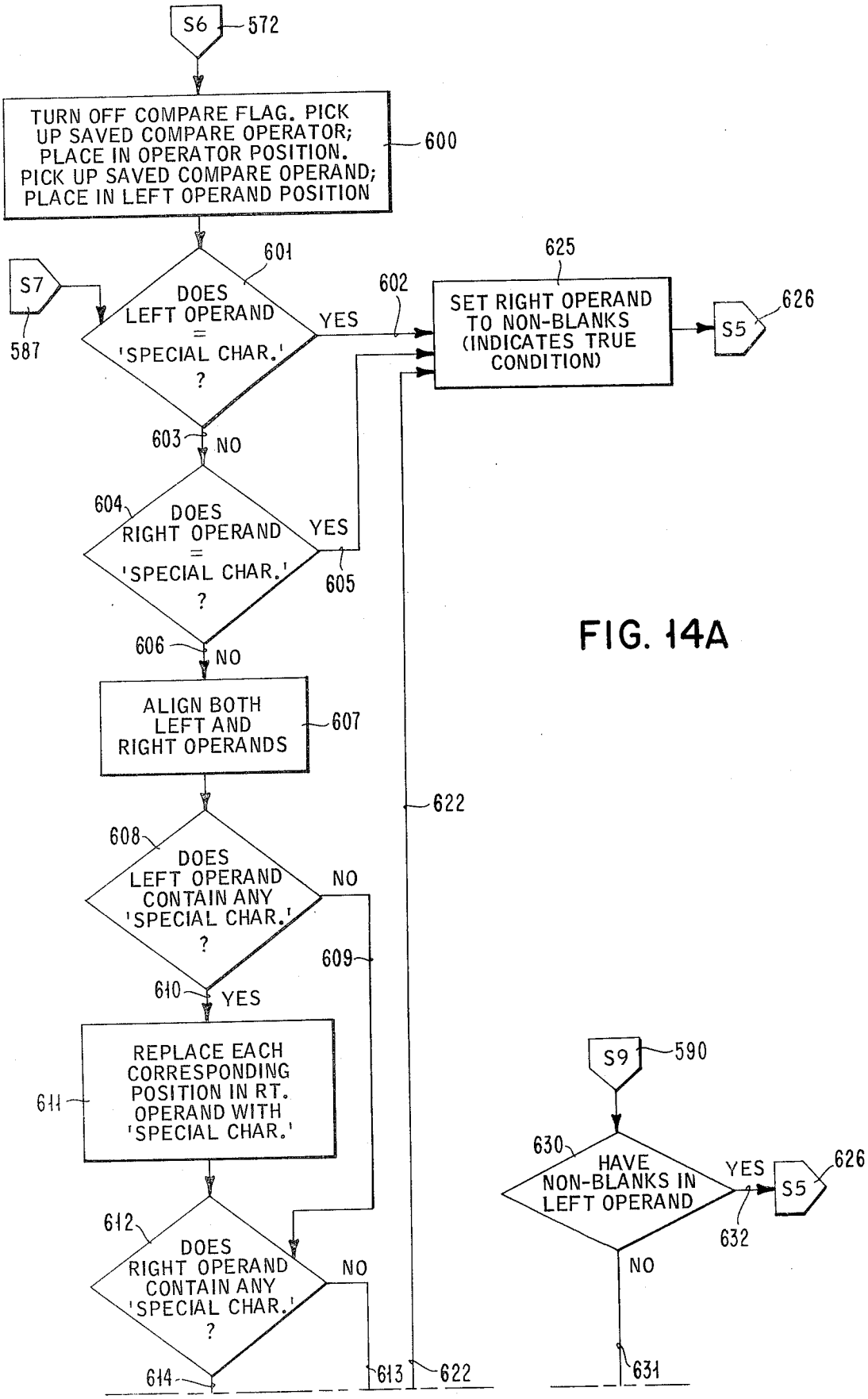
Figures 14B, 14C:
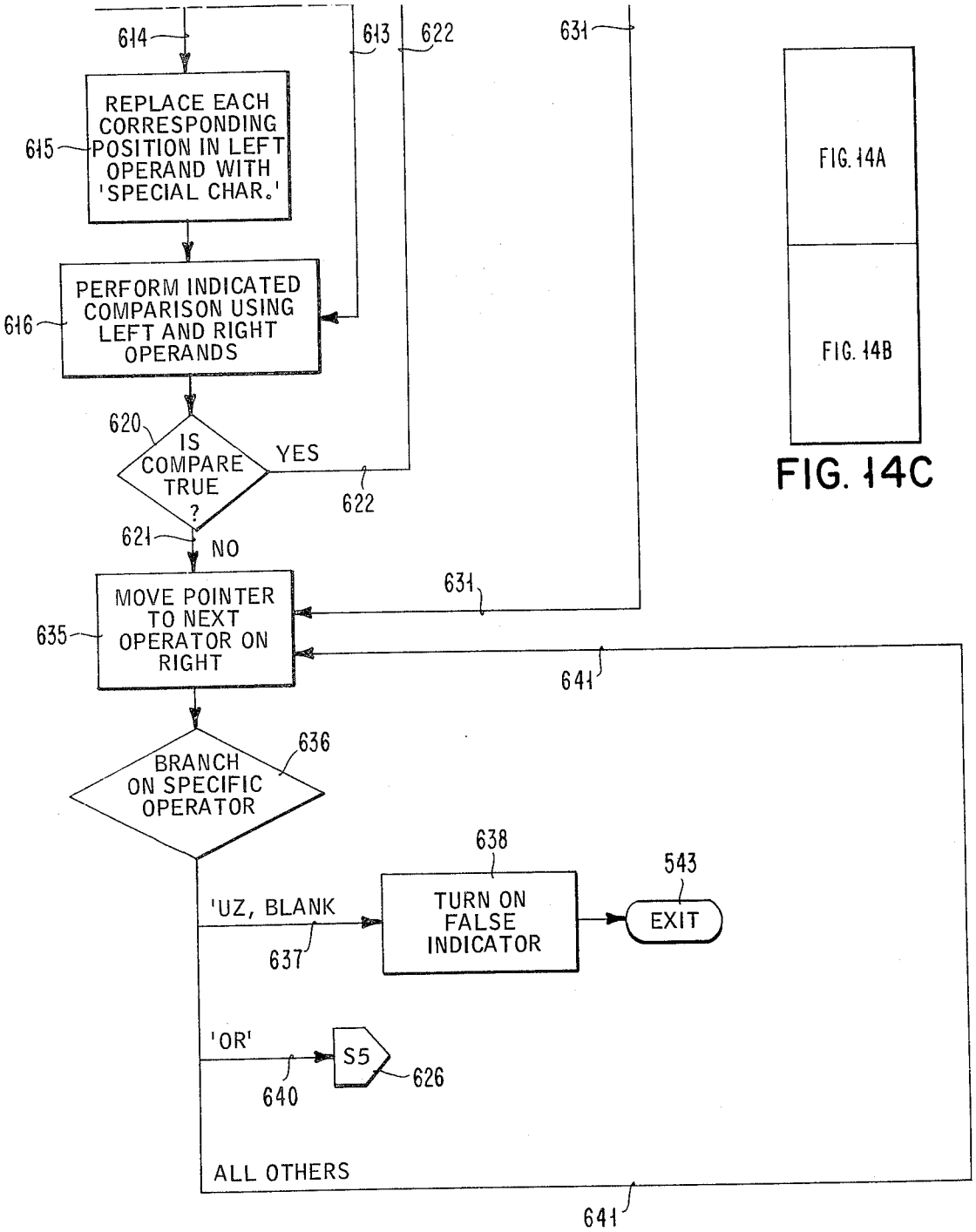
Figure 15:
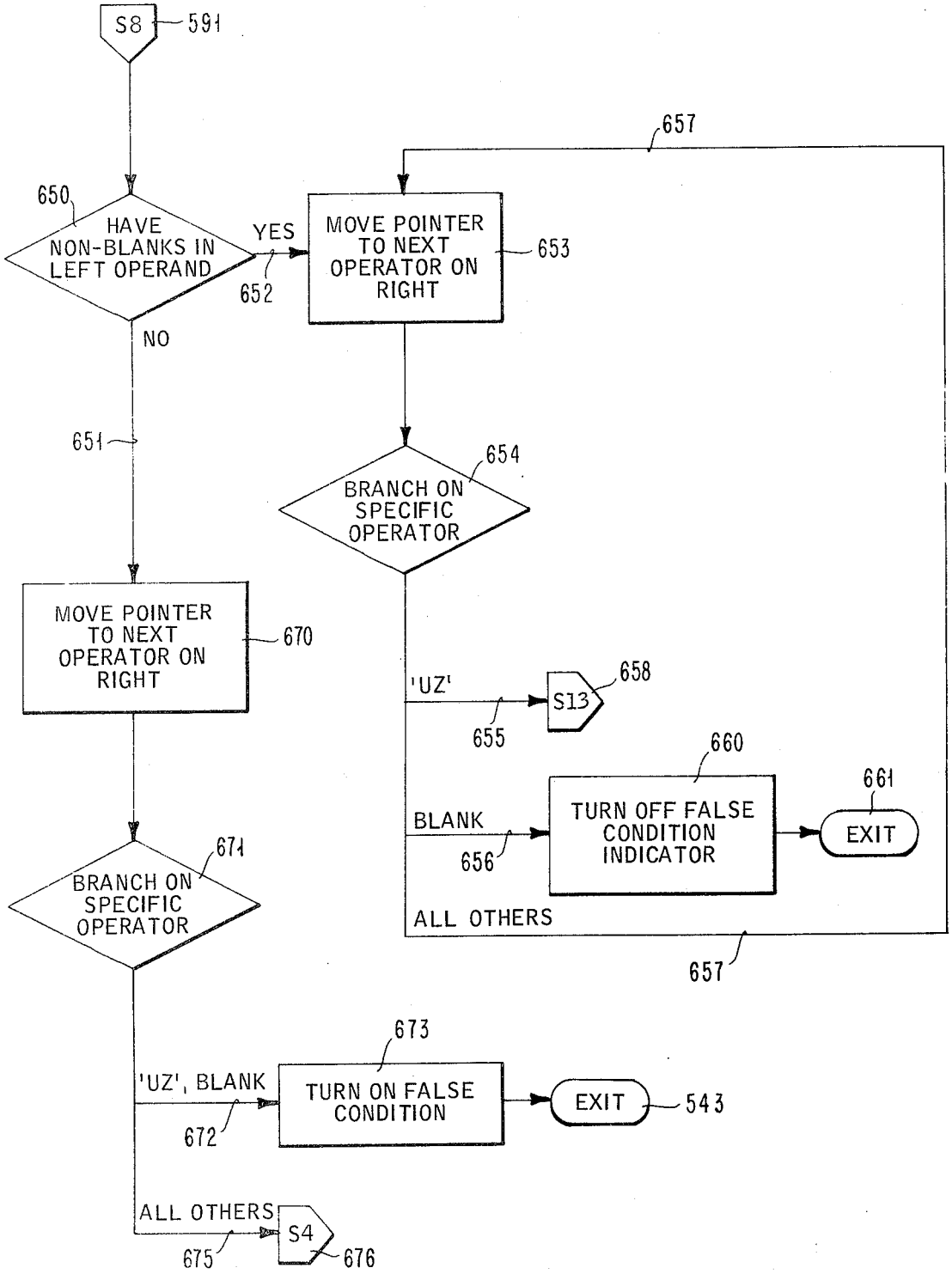

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 5

T940,001

METHOD AND APPARATUS FOR PRODUCING CUSTOMIZED PROGRAMMING INFORMATION

Bryce F. Ells, Bellevue, Wash., and Joyce M. Wrenn, Sunnyvale, Calif., assignors to International Business Machines Corporation, Armonk, N.Y.

Continuation of application Ser. No. 313,718, Dec. 11, 1972, which is a continuation of application Ser. No. 99,488, Dec. 18, 1970, now abandoned. This application Oct. 29, 1973, Ser. No. 411,594

Int. Cl. G06d *9/00*

U.S. Cl 444—1

38 Sheets Drawing. 170 Pages Specification

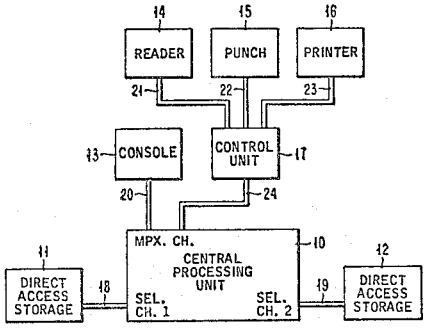

Method and apparatus for providing programs for a computer in response to answers to a questionnaire, the questions being arranged in individually identified sets. The answers comprise entries that may be a selection from among predetermined alternatives may be a supplied stipulation. The entries are checked in accordance with predetermined verification instructions associated with the set identification. The checks include whether each stipulation is of a designated type and value range, and include whether a designated number or designated ones of the alternatives were selected, the designations being by the associated verification instructions. An error output indication is generated in response to the negative result of any of the checking steps. Each entry is then responded to in accordance with predetermined customizing instructions associated with the set identification to select ones of the customizing instructions as directed by the selected alternatives and stipulations and modify certain specifications in the customizing instructions as directed by the supplied stipulations. The customizing instructions refer to designated statements comprising specifications of program steps and may delete, select or modify the designated statements, subject to further deletion, selection or modification in accordance with other instructions. Those customizing instructions that are activated are sorted into the order of appearance of the statements and employed to delete, select and modify the designated statements in accordance with inclusion codes thereof. The statements comprising specifications of program steps are provided at an output in the form of an actual computer program or in the form of information translatable directly into a computer program.

METHOD AND APPARATUS FOR PRODUCING CUSTOMIZED PROGRAMMING INFORMATION
Original Filed Oct. 29, 1973
FIG. 1
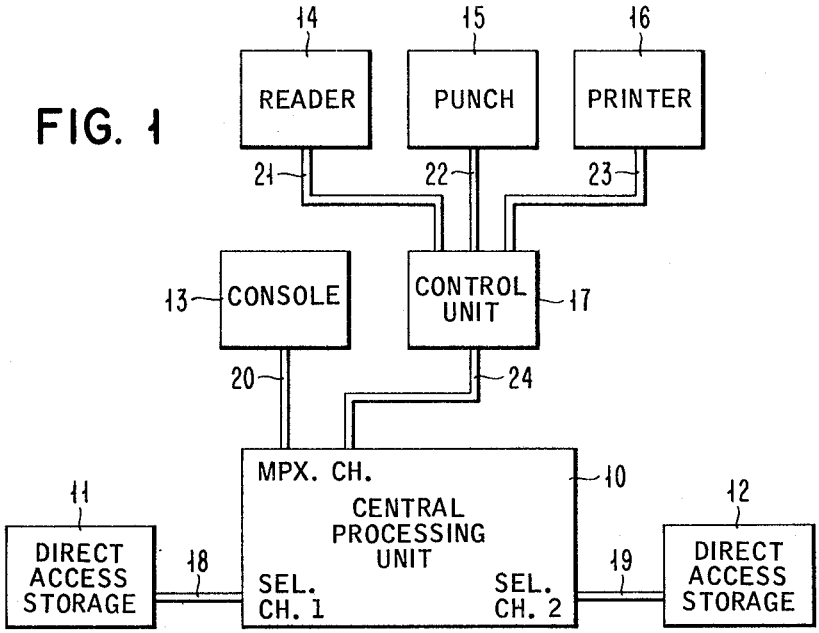
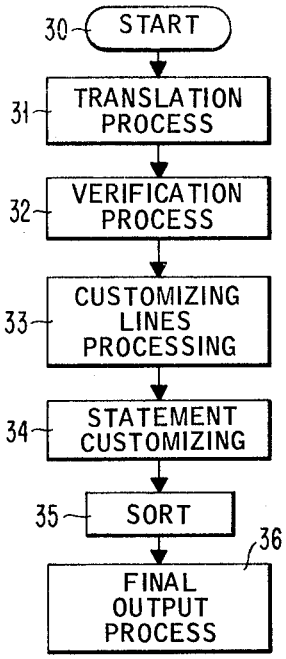
FIG. 2
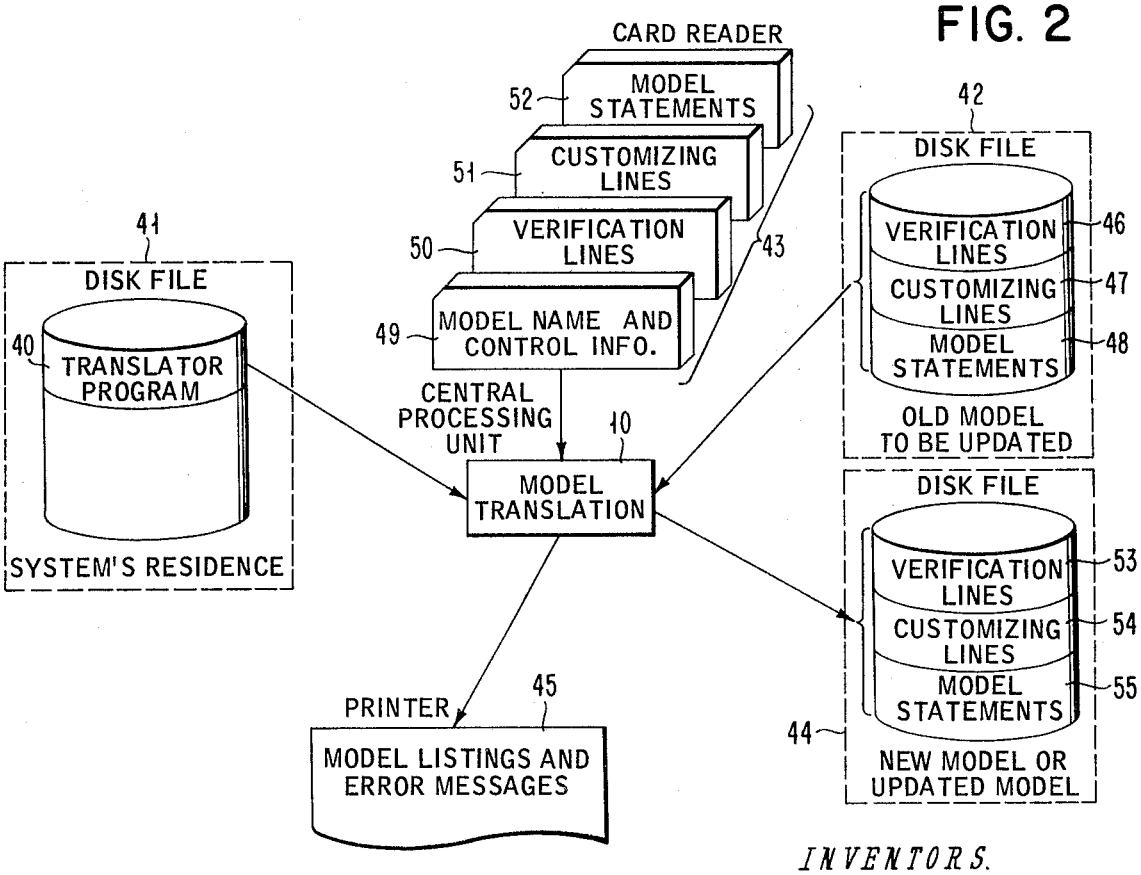
MODEL TRANSLATION SYSTEMS FLOW FIG. 3
*INVENTORS.*
BRYCE F. ELLS
JOYCE M. WRENN
BY John H. Holcombe
ATTORNEY

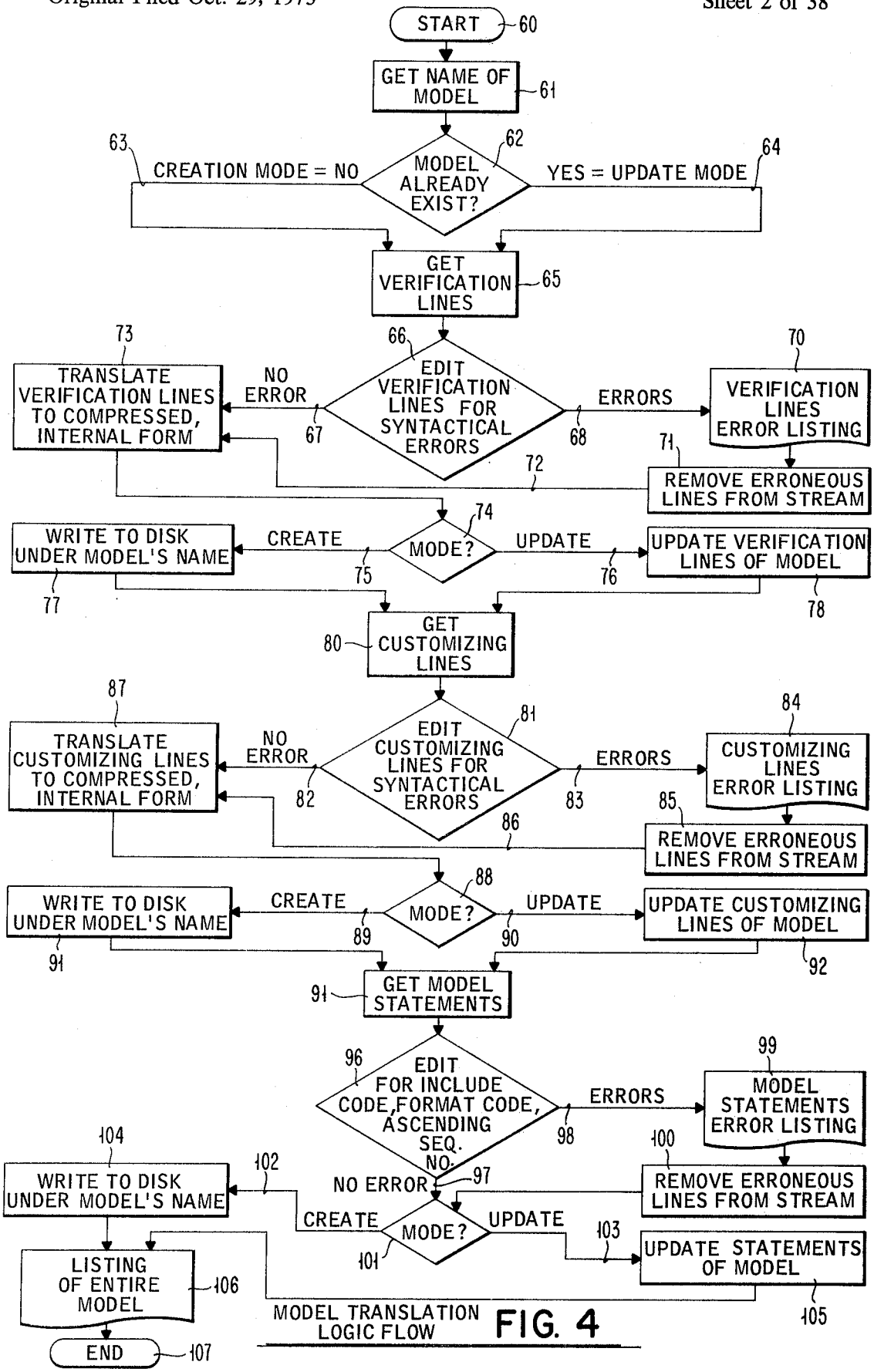
MODEL TRANSLATION LOGIC FLOW FIG. 4

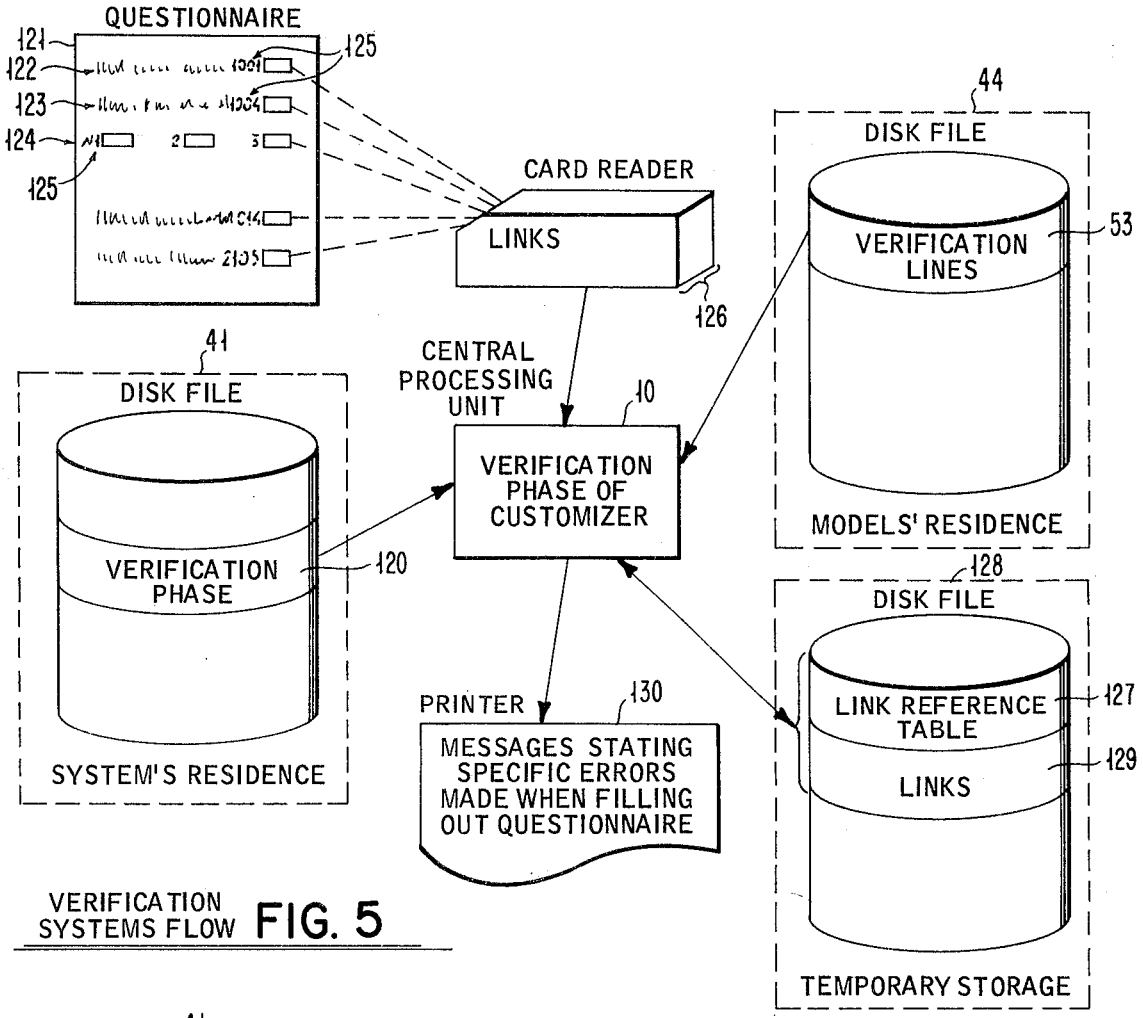
VERIFICATION SYSTEMS FLOW FIG. 5
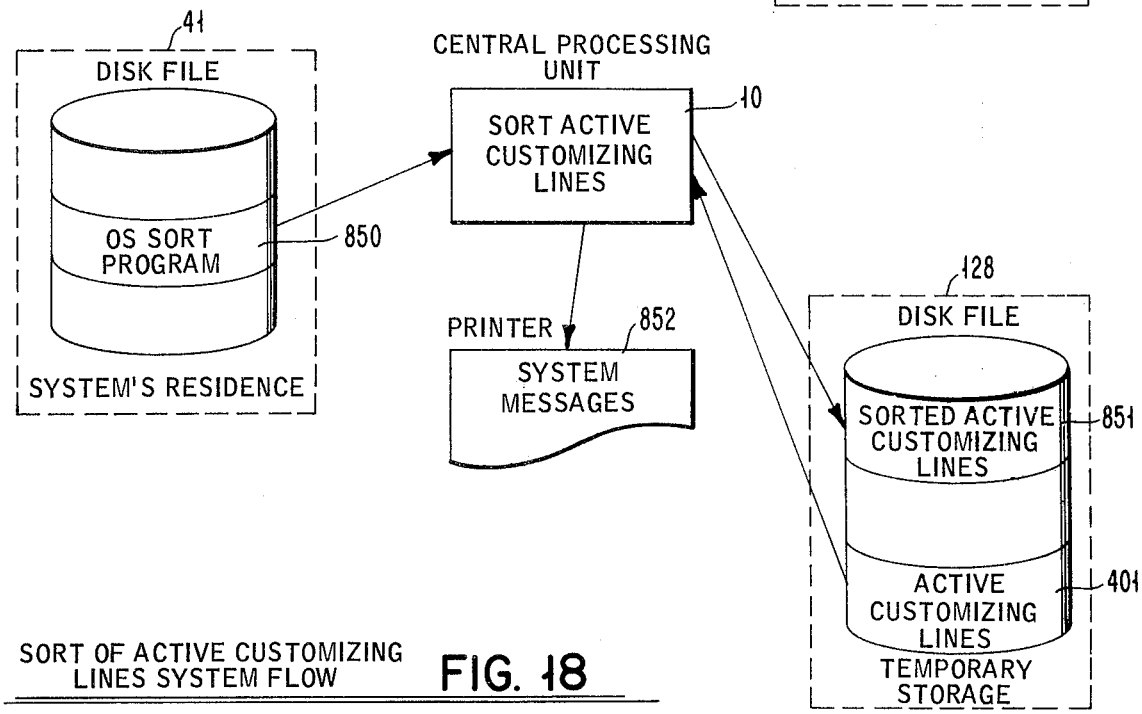
SORT OF ACTIVE CUSTOMIZING LINES SYSTEM FLOW FIG. 18

LINK VERIFICATION LOGIC FLOW

LINK VERIFICATION
LOGIC FLOW

LINK VERIFICATION LOGIC FLOW FIG. 8B

LINK VERIFICATION LOGIC FLOW

CUSTOMIZING LINES PROCESSING SYSTEMS FLOW

CUSTOMIZING LINES PROCESSING LOGIC FLOW FIG. 11

CUSTOMIZING LINES PROCESSING LOGIC FLOW

OP-OPERAND SUBROUTINE LOGIC FLOW

OP-OPERAND SUBROUTINE LOGIC FLOW

OP-OPERAND SUBROUTINE LOGIC FLOW

Figure 16A:
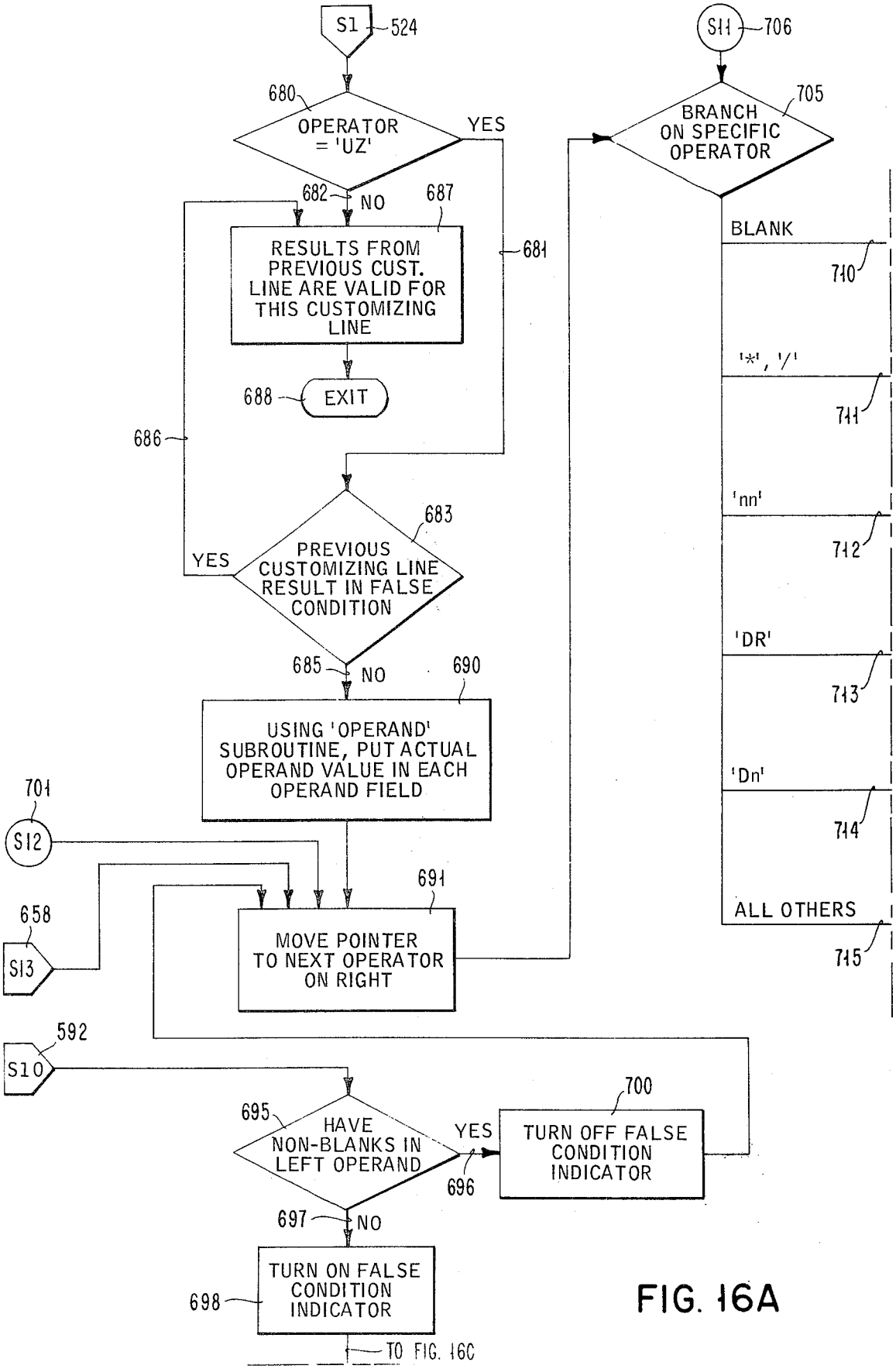
Figure 16B:
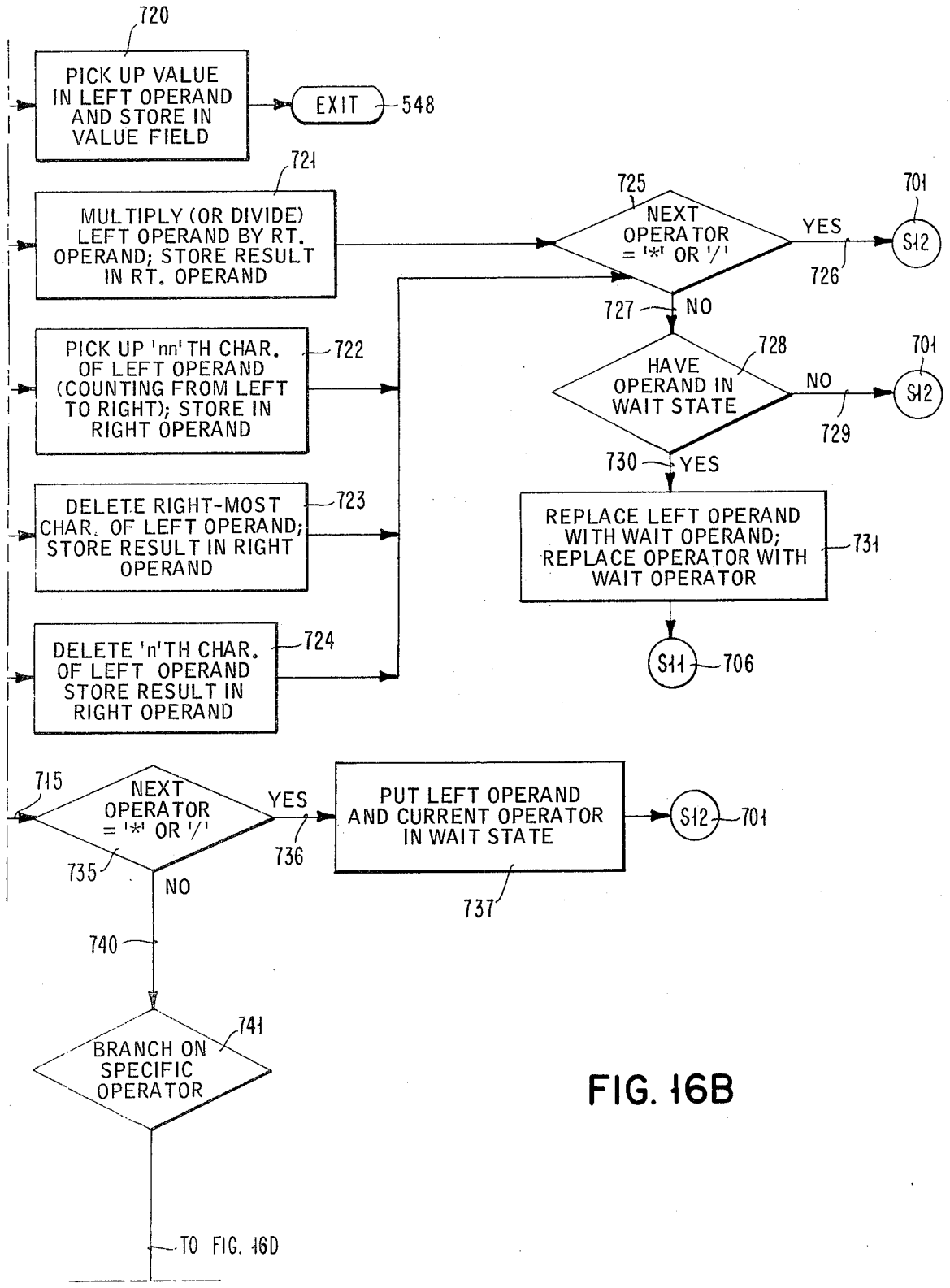
Figure 16C:
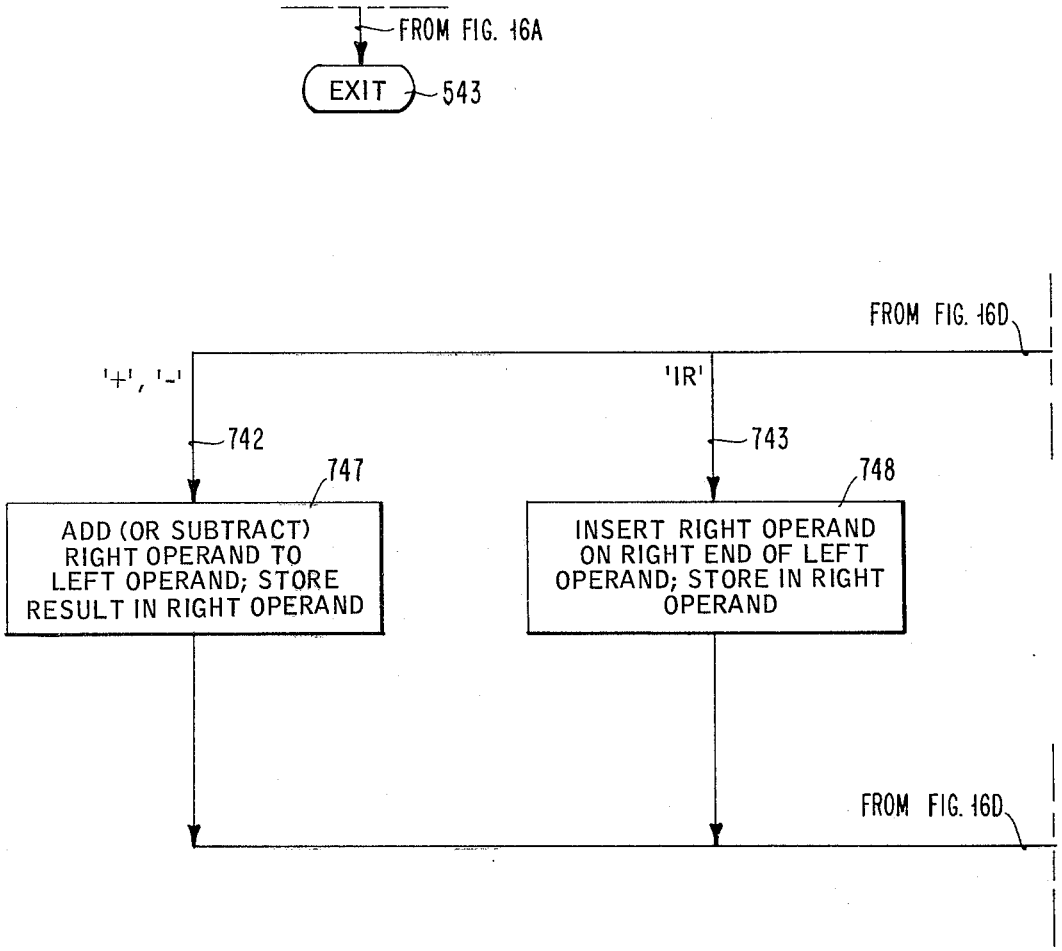
Figure 17:
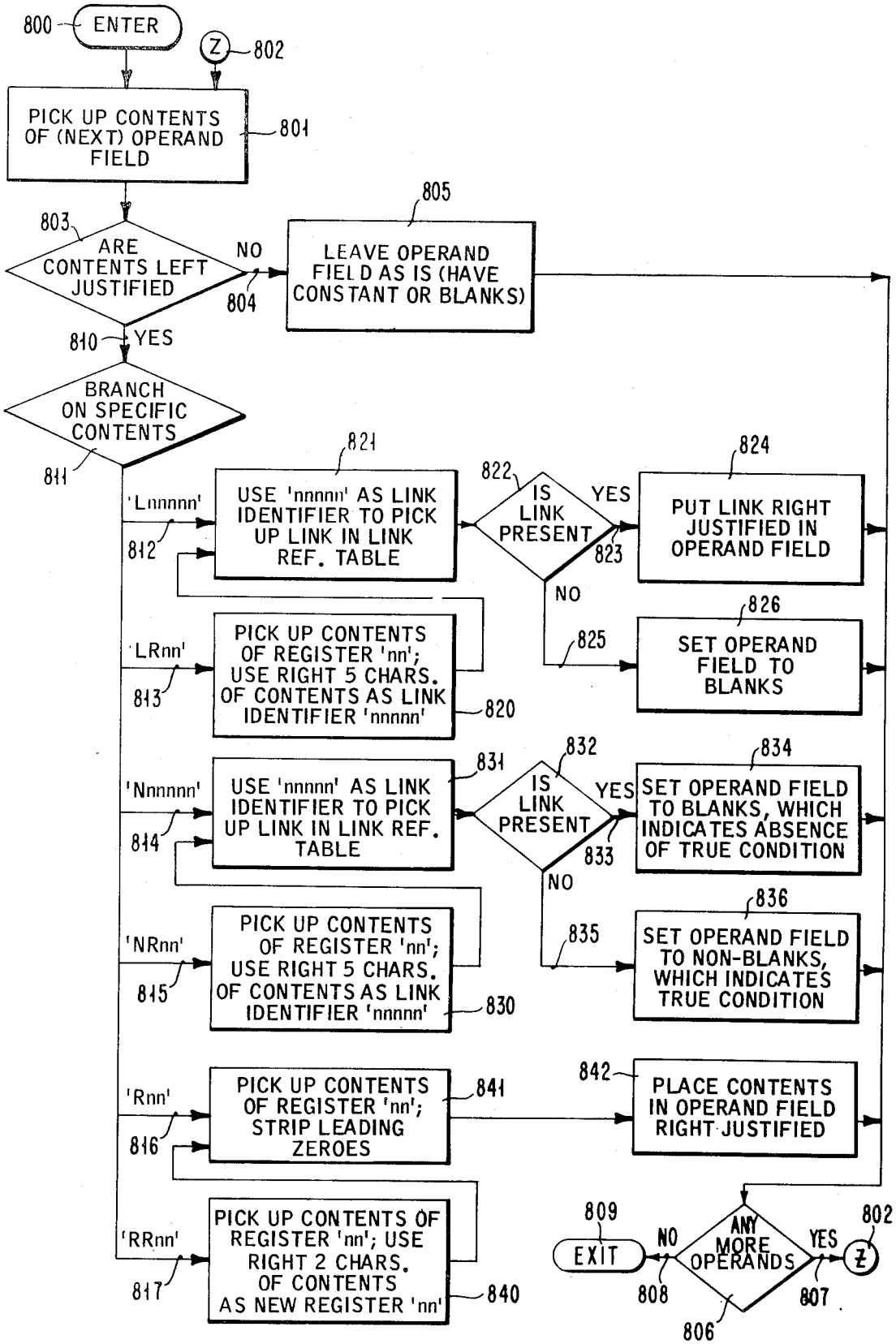
Figure 20A:
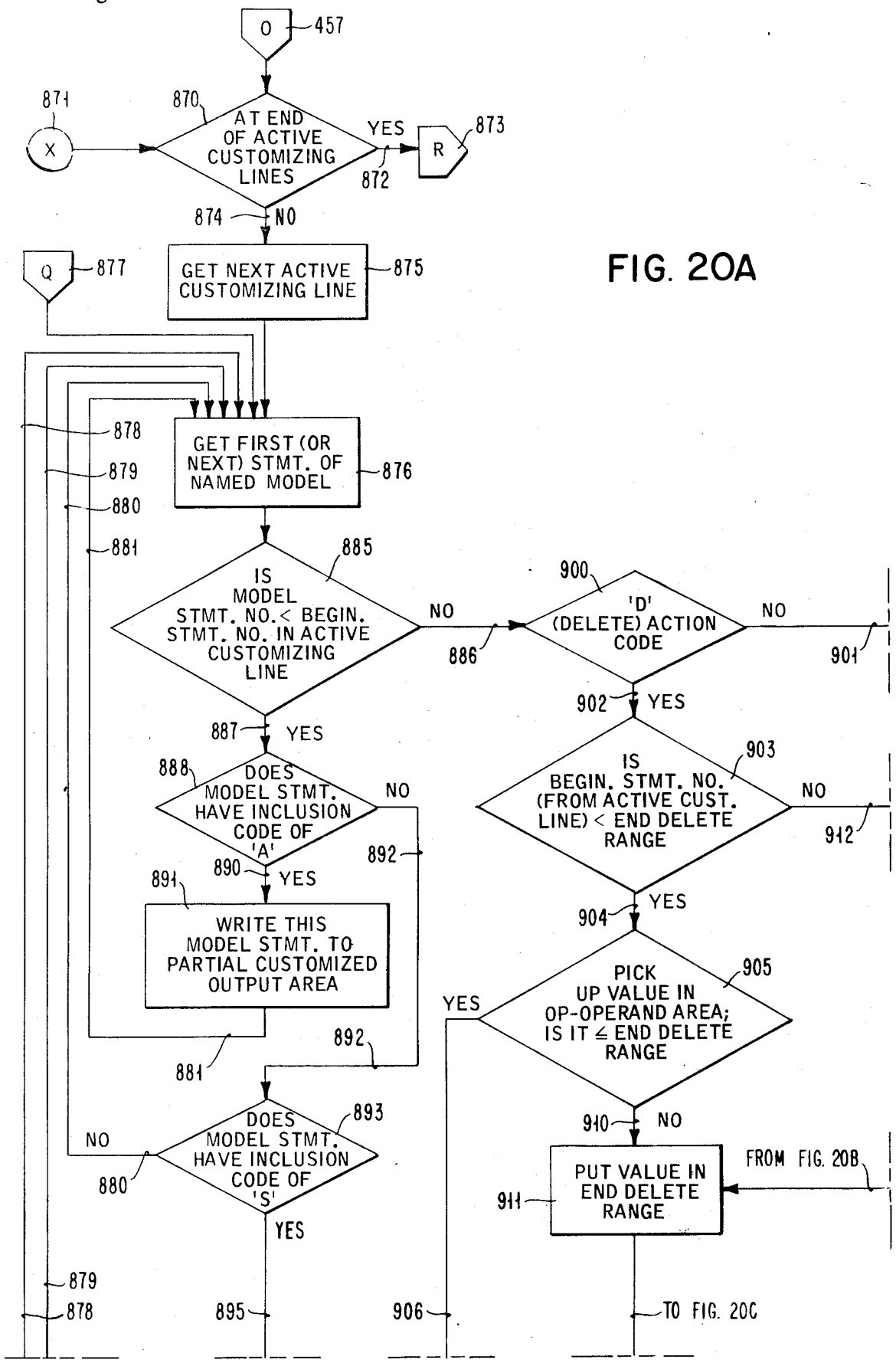
Figure 20B:
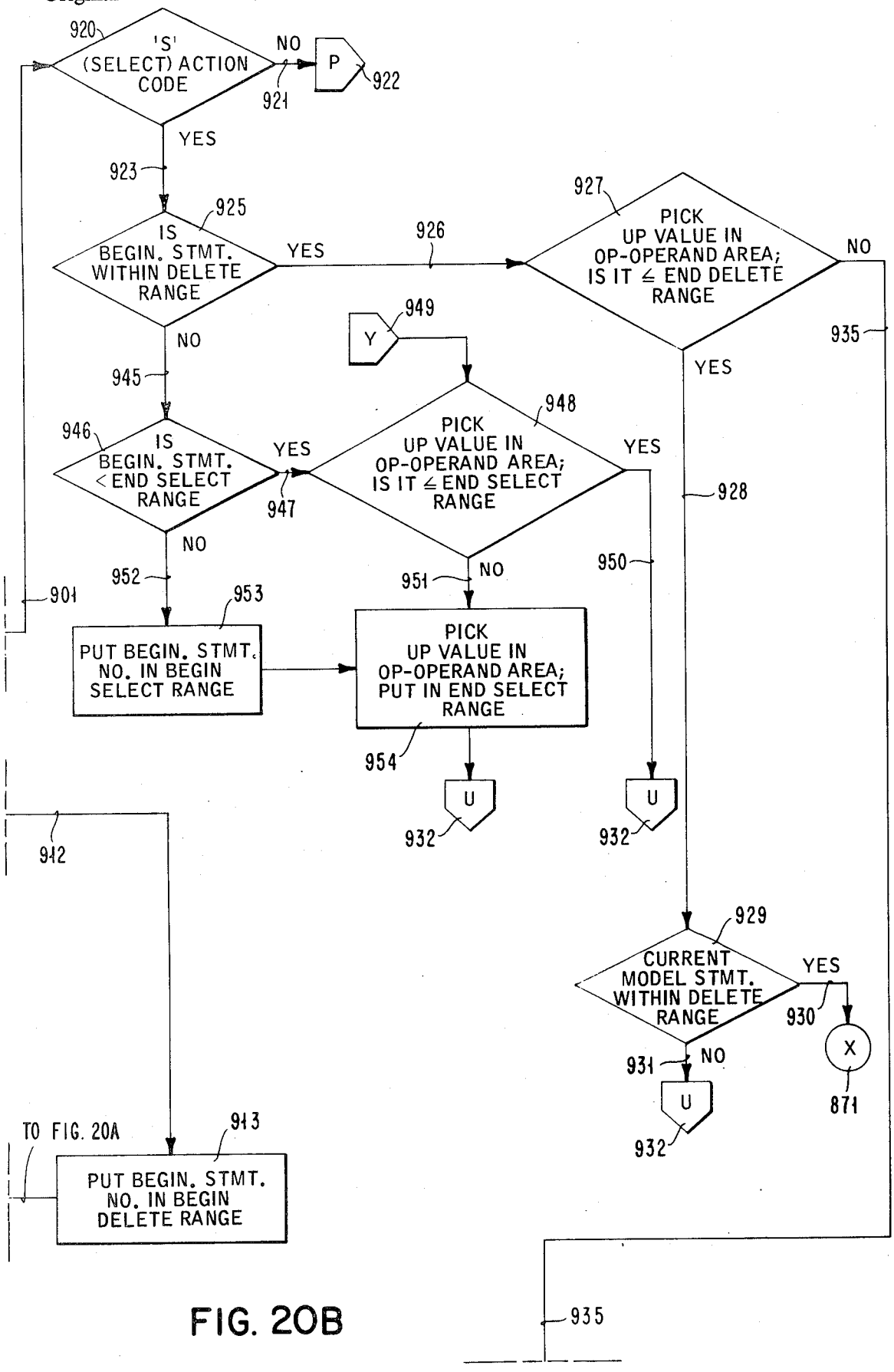
Figure 20C:
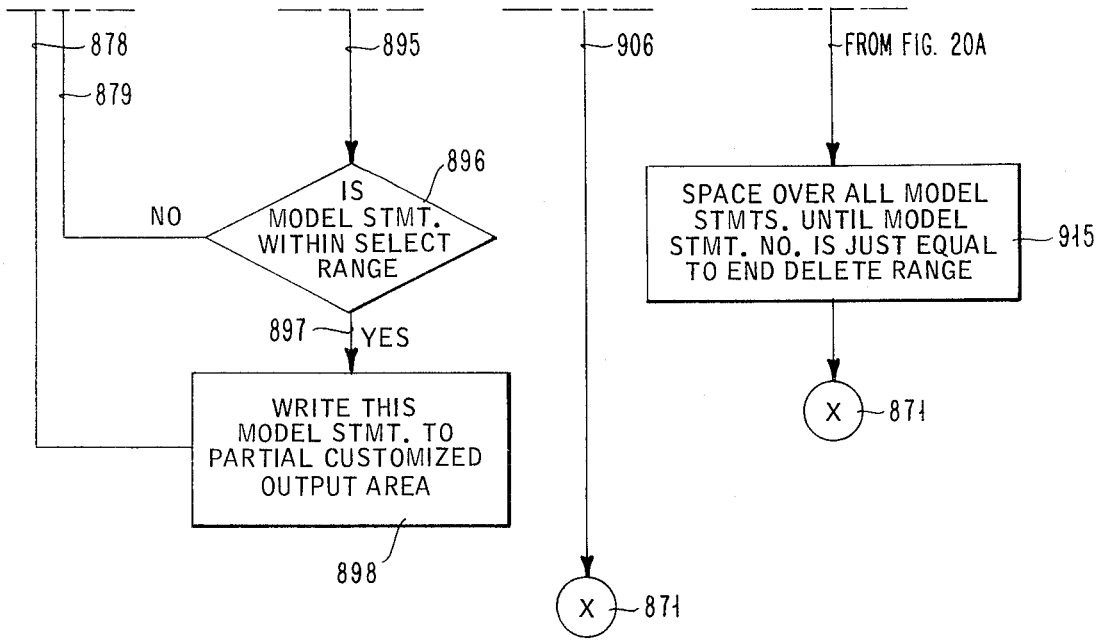
Figure 20D:
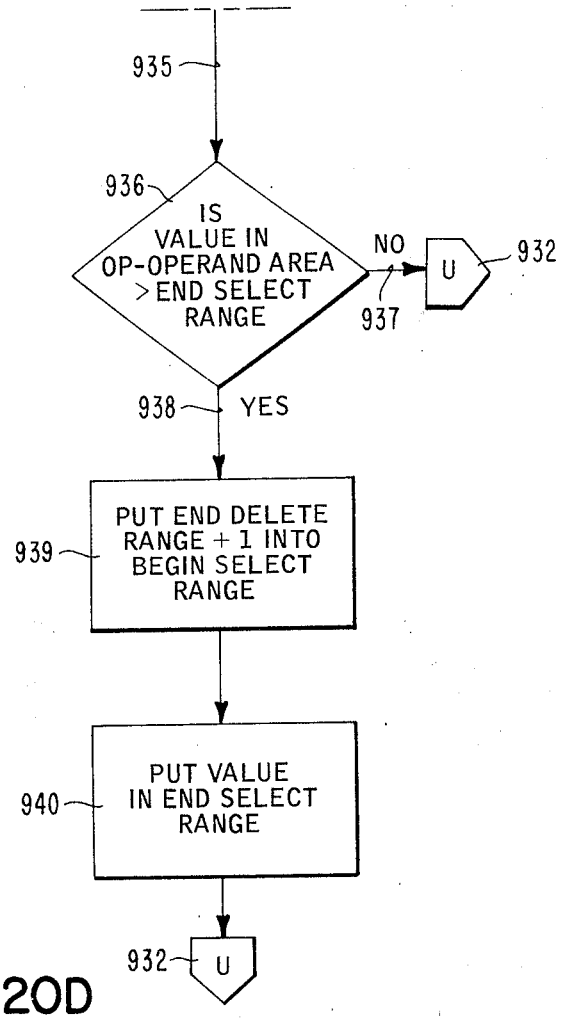
Figure 20E:
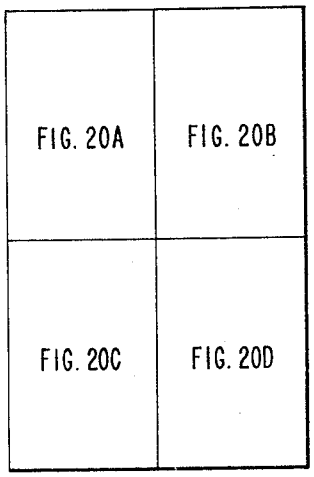
Figure 21:
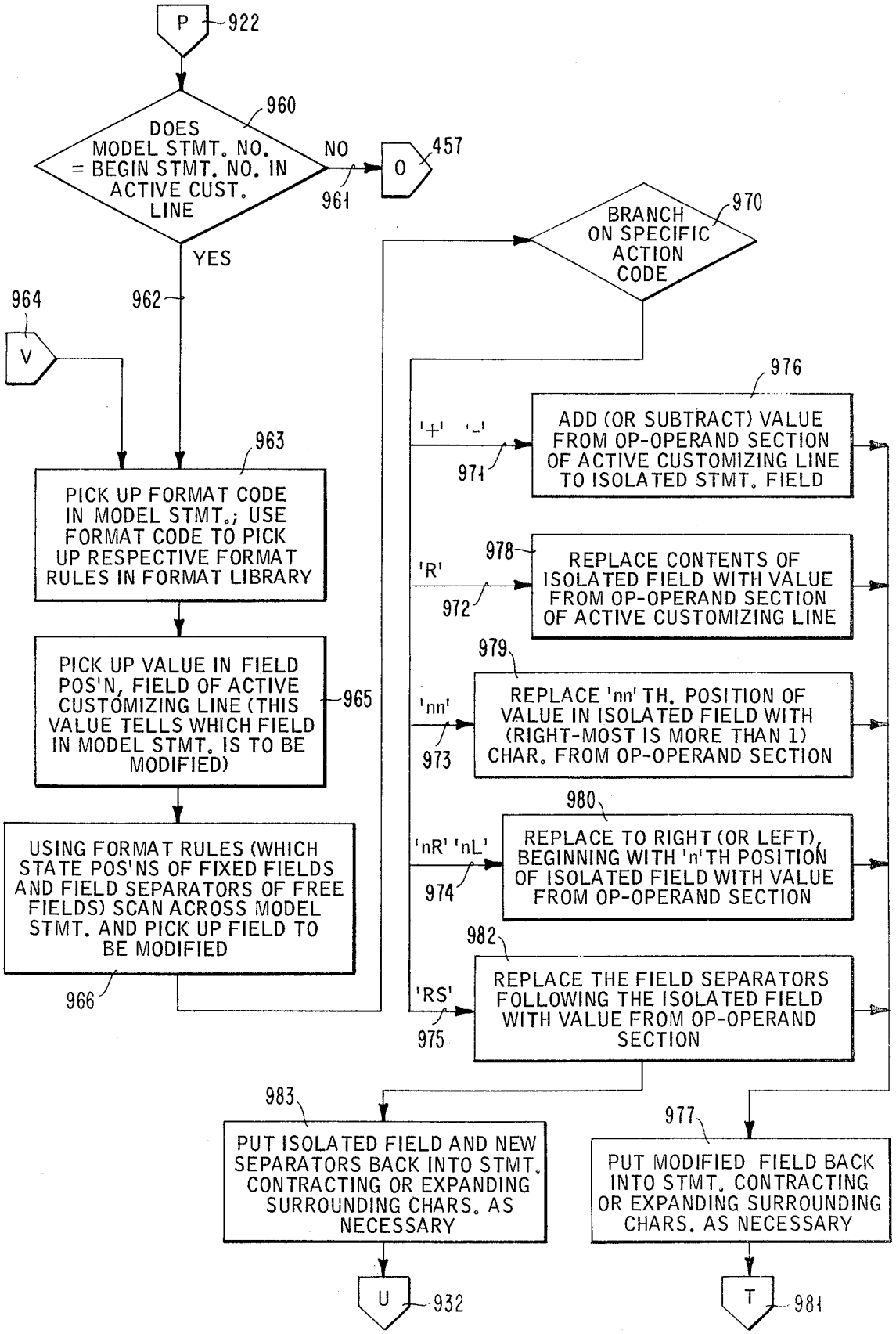
Figure 22:
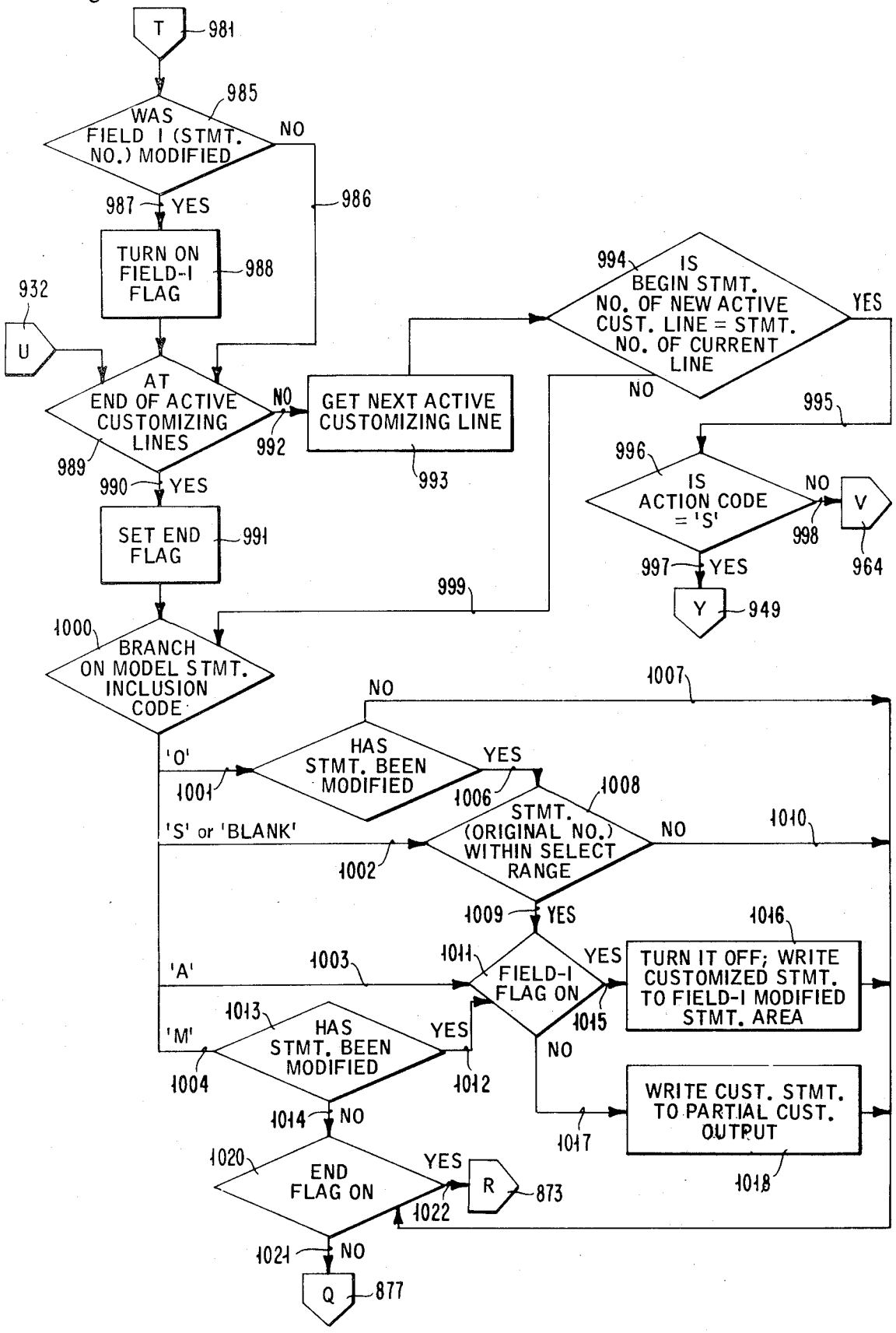
Figure 23:
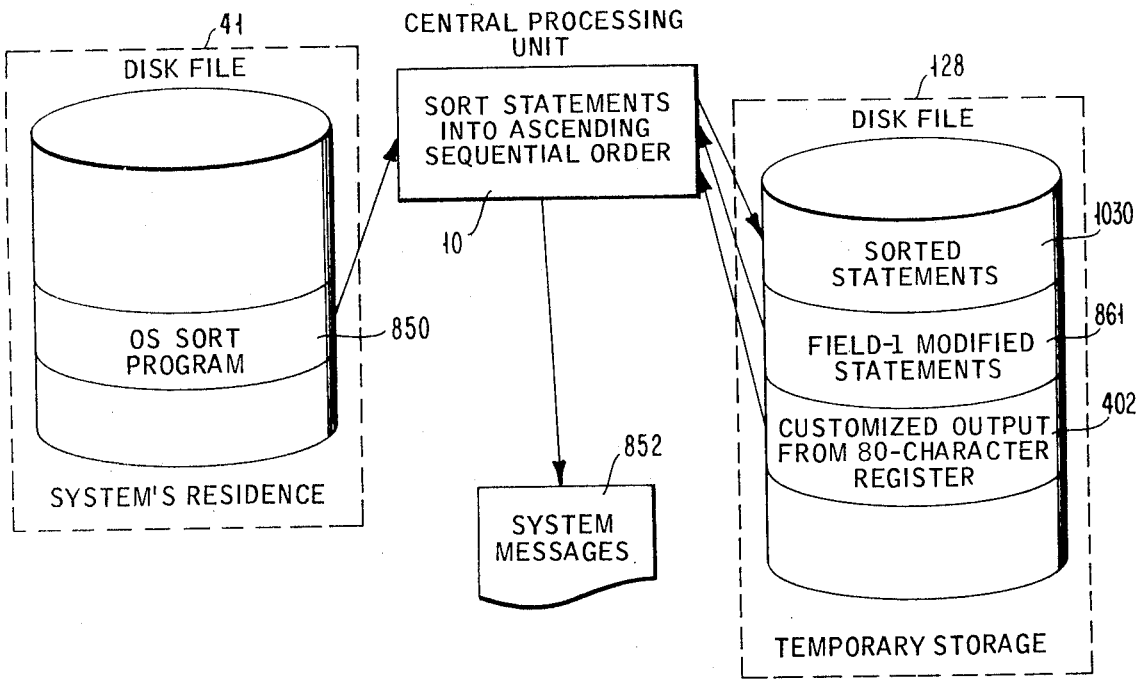
Figure 24:
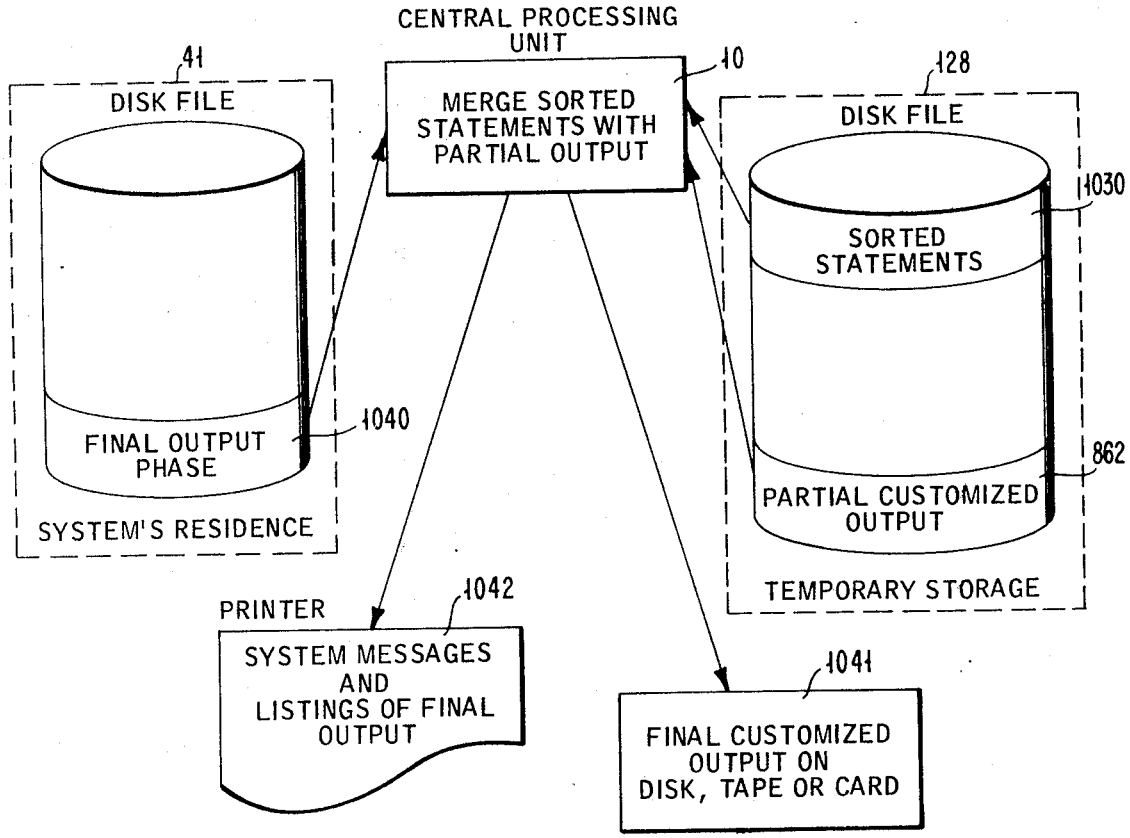

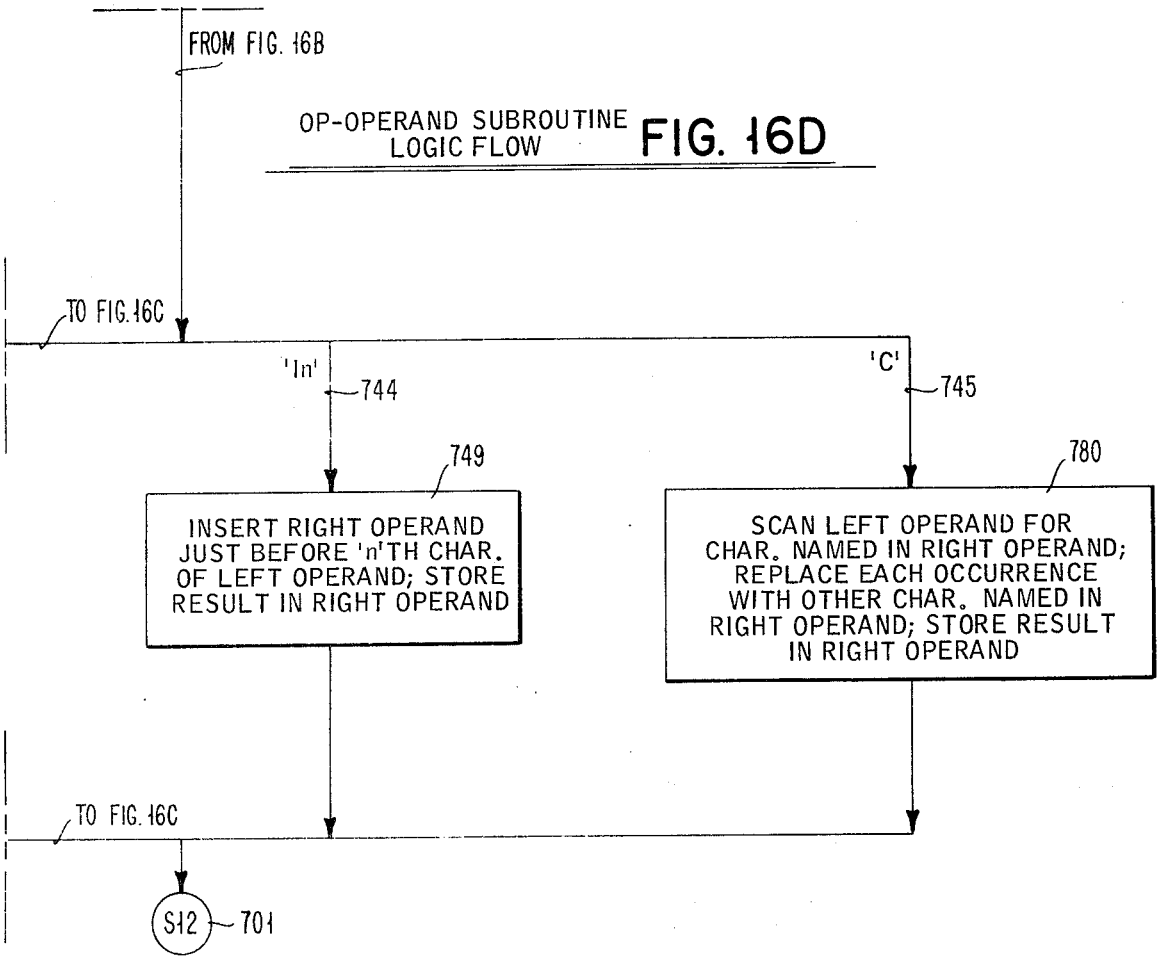
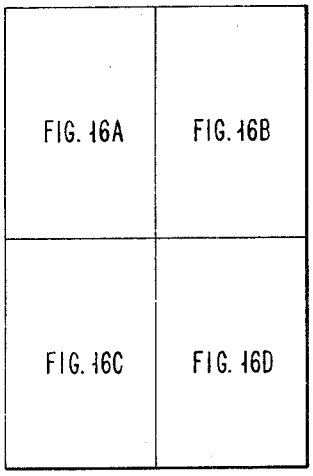
FIG. 16E

OPERAND SUBROUTINE
(WITHIN OP-OPERAND SUBROUTINE)
LOGIC FLOW

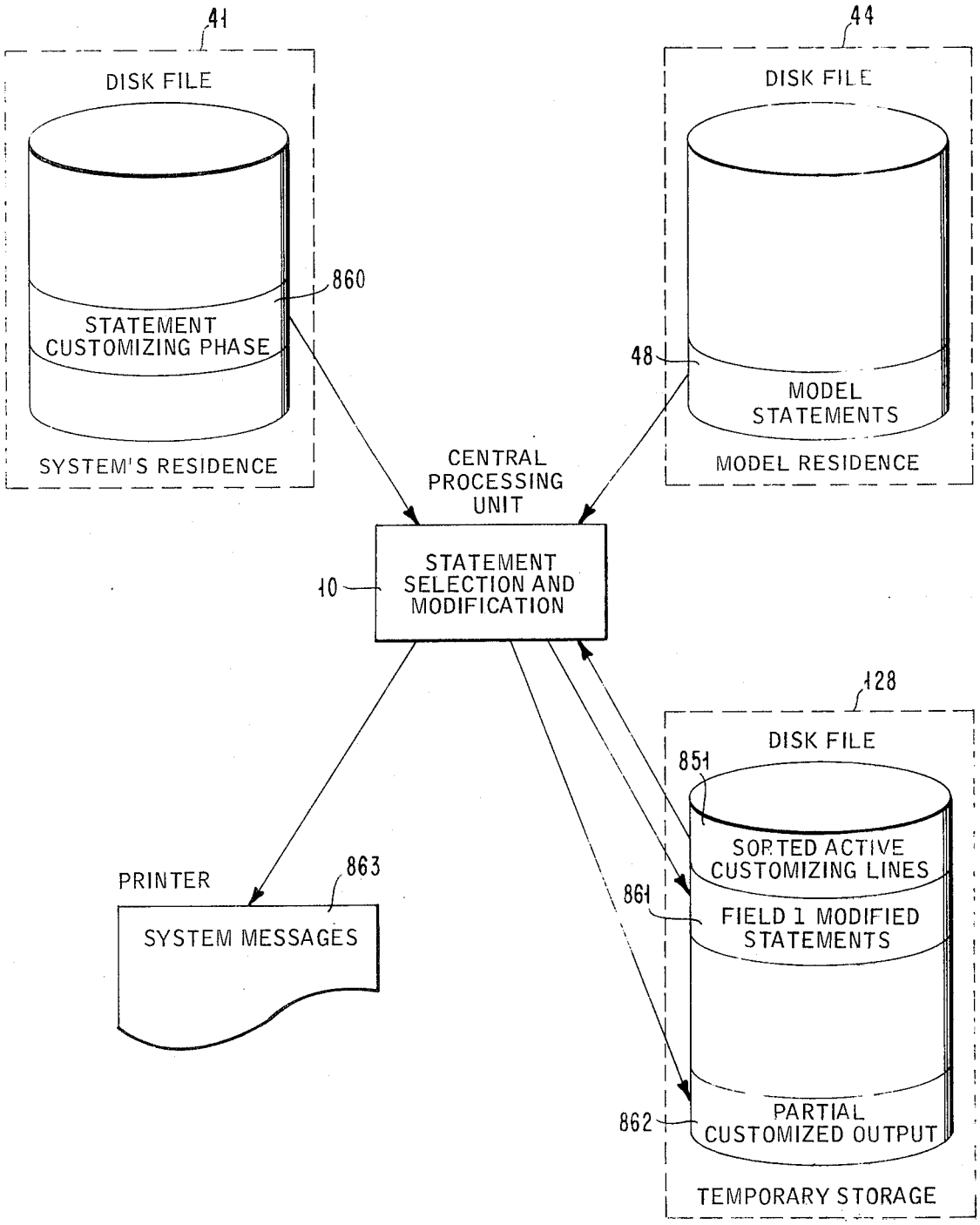
STATEMENT CUSTOMIZING SYSTEMS FLOW FIG. 19

STATEMENT CUSTOMIZING LOGIC FLOW

STATEMENT CUSTOMIZING LOGIC FLOW

STATEMENT CUSTOMIZING LOGIC FLOW

SORT OF GENERATED STATEMENTS AND STATEMENTS WHOSE STATEMENT NUMBER HAD BEEN CHANGED THROUGH CUSTOMIZING

FINAL OUTPUT PHASE SYSTEMS AND LOGIC FLOW

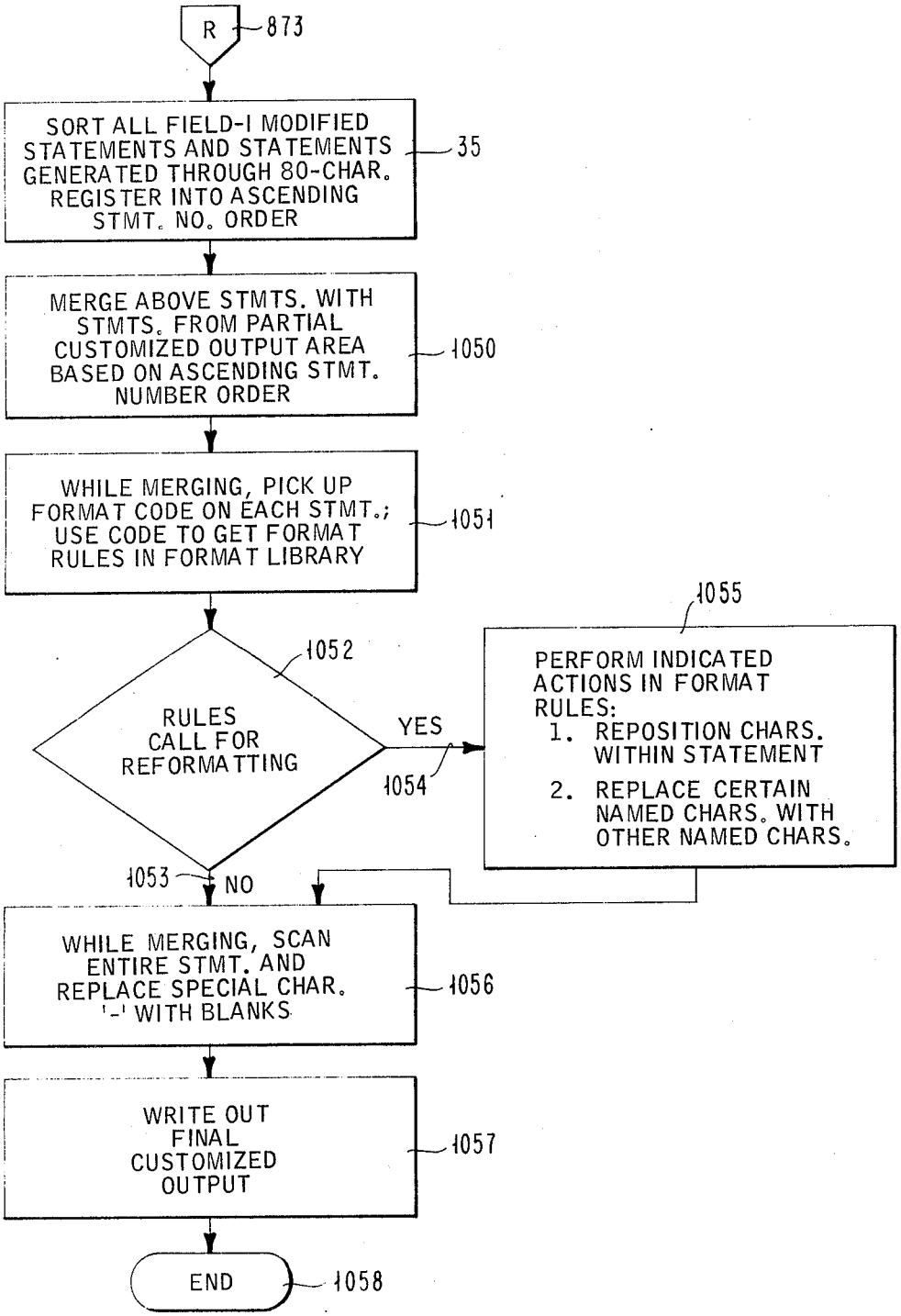
FINAL OUTPUT PHASE LOGIC FLOW FIG. 25

REPORT DESIGN
COMPLETION INSTRUCTIONS & CUSTOMER SPECIFICATIONS

TOTALS SECTION - EXPLANATION OF QUESTIONS

```
*****************************************************************************************
* THIS SECTION PROVIDES INFORMATION NECESSARY TO CORRELATE CONTROL FIELD CHANGES WITH CONTROL TOTALING, TOTALING, PAGE *
* CONTROL AND TOTAL LINE PRINTING.                                                      *
*****************************************************************************************

360. RESPOND WITH THE MAXIMUM NUMBER OF CONTROL LEVELS THAT THIS PROGRAM MUST CONSIDER TO DETERMINE TOTALS AND PAGE ADVANCES (NOT
     INCLUDING FINAL TOTALS).

365. IF DETAIL LINES ARE NOT TO BE PRINTED RESPOND WITH AN "X". THE TOTAL LINES WILL BE PRINTED IN ACCORDANCE WITH THE SPACING
     SPECIFIED IN QUESTION 390.

366. TOTALS WILL AUTOMATICALLY PRINT IN FIXED TOTAL LINE FORMAT - 10 CHARACTER ID, 5 CHARACTER VALUE, NINE 13 CHARACTER TOTALS.
     ALTERNATIVELY, IF THIS QUESTION IS ANSWERED, THE TOTALS WILL BE POSITIONED UNDER THE COLUMNS BEING TOTALED. THE USER MUST
     ALLOW 2 POSITIONS BETWEEN THE FIELDS TO PREVENT OVERLAPPING. NO TOTALS WILL BE PRINTED IN PRINT POSITIONS 1 THRU 15.

370. INDICATE WHICH OF THE CONTROL FIELDS INDICATED IN THE INPUT-OUTPUT SECTION ARE FOR PAGE ADVANCE PURPOSES BY LISTING THE
     "CL" NUMBERS SHOWN IN THE INPUT-OUTPUT SECTION.

380. INDICATE WHICH OF THE CONTROL LEVEL VALUES ARE TO CAUSE A TOTAL LINE TO BE PRINTED AND THE FORM TO BE ADVANCED TO THE NEXT
     PAGE BY LISTING THE "CL" VALUE ASSIGNED IN THE INPUT-OUTPUT SECTION IN THE RESPONSE BOXES.

390. IF CONTROL LEVELS (QUESTION 360) WERE REQUESTED, RESPOND TO THIS QUESTION. IF TOTAL LINES ARE TO BE PRINTED ON SPECIFIC
     PRINT LINES, RESPOND WITH A 3 DIGIT NUMBER INDICATING WHICH LINE EACH TOTAL LINE IS TO OCCUPY.
     IF TOTAL LINES REQUIRE SPACING WHICH IS DIFFERENT THAN THE REGULAR SPACING OF THE REPORT, RESPOND WITH "SN" WHERE N IS THE
     NUMBER OF BLANK LINES TO BE INSERTED BEFORE AND AFTER THE TOTAL LINE.
     IF THERE IS NO RESPONSE TO THIS QUESTION, THE PROGRAM WILL PRINT THE TOTAL LINES ON THE NEXT AVAILABLE LINE.

400. IF CONTROL LEVELS (QUESTION 360) WERE NOT REQUESTED, INDICATE ON WHICH LINE EACH "FINAL TOTAL LINE" REQUIRED IS TO BE
     PRINTED.

410. IF CONTROL TOTALS (QUESTION 360) WERE REQUESTED, THE GENERATION OF THE "FINAL TOTAL LINE" IS AUTOMATIC. INDICATE HERE WHERE
     IT IS TO BE PRINTED.
     IF THERE IS NO RESPONSE TO THIS QUESTION, THE "FINAL TOTAL LINE" WILL NOT BE PRINTED. AS IN QUESTION 390, "SN" MAY BE USED.
*****************************************************************************************
```

TOTALS SECTION - QUESTIONS

```
*****************************************************************************************
* IF THIS REPORT REQUIRES TOTALS, SUB-TOTALS OR FORMS CONTROL, COMPLETE THE FOLLOWING; OTHERWISE GO TO THE FOLLOWING PAGE. *
*****************************************************************************************
360. HOW MANY CONTROL LEVELS ARE REQUIRED.        0094(1).3|
365. ARE ONLY CONTROL TOTAL LINES TO BE PRINTED.      (2)._|
366. ARE TOTALS TO APPEAR UNDER COLUMNS TOTALED.      (3).X|
370. WHICH OF THE CONTROL LEVELS ARE FOR PAGE ADVANCE ONLY.                          0095.2|_|_|_|_|_|_|_|_|
380. WHICH OF THE CONTROL LEVELS REQUIRE A TOTAL LINE TO BE PRINTED AND THE PAGE TO BE ADVANCED.  0096.1|3|_|_|_|_|_|_|_|
```

TOTAL LINE SPACING

```
390. WHERE ARE THE CONTROL TOTAL LINES TO BE PRINTED.
                                  CONTROL LEVEL  1    2    3    4    5    6    7    8    9
                                        0097.015|_._|S4.|_._|_._|_._|_._|_._|_._|_._|
                                              (1)  (2)  (3)  (4)  (5)  (6)  (7)  (8)  (9)

400. WHERE ARE THE FINAL TOTAL LINE(S) TO PRINT.
                                        0098._._|_._|_._|_._|_._|_._|_._|_._|_._|
                                              (1)  (2)  (3)  (4)  (5)  (6)  (7)  (8)  (9)
410. WHERE IS THE FINAL TOTAL LINE TO PRINT.      0099(1)._._|
```

FIG. 26

| OPERAND | OP | OPERAND | OP | OPERAND | OP | OPERAND | OP | OPERAND | OP | OPERAND | CONT ON NEXT LINE | ACTION | LOW MIN. ← RANGE VALUE LENGTH → HIGH MAX | * | SEQ NO |
|---|---|---|---|---|---|---|---|---|---|---|---|---|---|---|---|
| * VERIFICATION FOR FINAL TOTAL PROCESSING | | | | | | | | | | | | | | * | 000000 |
| L00941 | | L00981 | | | | | | | | | | NM | | | 000010 |
| L00989 | | L00988 | | L00987 | | L00986 | | L00985 | | L00984 | X | | | | 000040 |
| | | L00983 | | L00982 | | L00981 | | | | | | AF | | | 000040 |
| N00941 | AN | L00991 | | | | | | | | | | ER | | | 000060 |
| WHEN CONTROL TOTALS ARE NOT SELECTED, THEN THE | | | | | | | | | | | X | | | | 000060 |
| MULTI-FINAL-TOTAL LINE QUESTION (QUESTION 400) | | | | | | | | | | | X | | | | 000060 |
| MUST BE ANSWERED FOR FINAL TOTALS, NOT QUES. 410. | | | | | | | | | | | | | | | 000060 |
| TOTALS | | CONTROL | | LEVELS, | | PRINT | | LINES, | | FORMS | CONTROL | | | * | 000379 |
| L00941 | | | | | | | | | | | | N | 1 | 9 | 000380 |
| L00942 | | L00943 | | | | | | | | | | NM | | | 000384 |
| L00951 | | L00952 | | L00953 | | L00954 | | L00955 | | L00956 | | N | 1 | 9 | 000390 |
| L00957 | | L00958 | | L00959 | | L00961 | | L00962 | | L00963 | | N | 1 | 9 | 000400 |
| L00964 | | L00965 | | L00966 | | L00967 | | L00968 | | | | N | 1 | 9 | 000410 |
| L00969 | | | | | | | | | | | | N | 1 | 9 | 000420 |
| L00991 | | | | | | | | | | | | B | 1 | 3 | 000580 |
| L00991 | 01 | | NE | | | SANL00991+ | | | 2GEL00902 | | | ER | | | 000590 |
| FINAL TOTAL LINE NO. TOO LARGE FOR REPORT DEPTH | | | | | | | | | | | | | | | 000590 |

FIG. 27

| OPERAND | OP | OPERAND | OP | OPERAND | OP | OPERAND | OP | OPERAND | OP | OPERAND | CONT. ON NEXT LINE | ACTION | BEGIN STMT NO | FIELD POSN. OR END STMT NO | BR PT * | SEQ NO |
|---|---|---|---|---|---|---|---|---|---|---|---|---|---|---|---|---|
| ** | | MAXIMUM | | NO. OF | | CONTROL | | LEVELS | | REQUIRED | | | ** | | * | 002650 |
| L00941 | | | | | | | | | | | | S009199 | 009200 | | | 002700 |
| | | | | | | | | | | | | S009240 | 009241 | | | 002800 |
| | | | | | | | | | | | | S009176 | 009176 | | | 002900 |
| | | | | | | | | | | | | S120480 | 120480 | | | 003000 |
| | | | | | | | | | | | | S000490 | 000492 | | | 003100 |
| | | | | | | | | | | | | S000495 | 000498 | | | 003400 |
| | | | | | | | | | | | | S008663 | 008665 | | | 003500 |
| L00941 | OR | L00943 | OR | L00991 | OR | L00981 | OR | L00982 | UZ | | . | 12008662 | | 3 | | 003600 |
| | UZ | 7 | | | | | | | | | | R008662 | | 4 | | 003700 |
| | | | | | | | | | | | | R008662 | | 5 | | 003800 |
| L00941 | | | | | | | | | | | | S120500 | 120540 | | | 003900 |
| L00941 | AN | N00942 | | | | | | | | | | S120469 | 120469 | | | 004000 |
| L00941 | | | | | | | | | | | | S000300 | 000300 | | | 004300 |
| | | | | | | | | | | | | ZL120001 | | 5 | | 004400 |
| L00941 | UZ | L00941 | + | 120470 | | | | | | | | RR07 | | | | 004500 |
| | | | | | | | | | | | | S120470 | R07 | | | 004600 |
| L00941 | EQ | 1 | UZ | 7 | | | | | | | | R120001 | | 5 | | 004700 |
| | | | | | | | | | | | | R120001 | | 4 | | 004800 |
| | UZ | . | | | | | | | | | | R120001 | | 3 | | 004900 |

FIG. 28

| OPERAND | OP | OPERAND | OP | OPERAND | OP | OPERAND | OP | OPERAND | OP | OPERAND | CONT ON NEXT LINE | ACTION | BEGIN STMT NO. | FIELD POSN OR END STMT NO. | | SEQ NO |
|---|---|---|---|---|---|---|---|---|---|---|---|---|---|---|---|---|
| 1 6 | 7 8 | 9 14 | 15 16 | 17 22 | 23 24 | 25 30 | 31 32 | 33 38 | 39 40 | 41 55 | 56 | 57 58 | 59 64 | 65 70 | 71 72 | 73 77 |
| L00941 | UZ | 120211 | | | | | | | | | | RR07 | | | | 005000 |
| L00941 | UZ | L00941 | IR | 0 | | | | | | | | +R07 | | | | 005100 |
| L00941 | | | | | | | | | | | | +R07 | | | | 005200 |
| L00941 | UZ | 10 | | | | | | | | | | 9RR07 | | 7 | | 005300 |
| | UZ | 1 | | | | | | | | | | -R07 | | | | 005400 |
| L00941 | | | | | | | | | | | | DR07 | R07 | | | 005500 |
| L00941 | UZ | L00941 | + | 1 | | | | | | | | RR02 | | | | 005600 |
| | UZ | L00941 | +009300 | | | | | | | | | RR15 | | | | 005700 |
| L00941 | UZ | 7 | | | | | | | | | | RR15 | | 10 | | 005800 |
| | | | | | | | | | | | | RR15 | | 9 | | 005900 |
| ** | | FINAL TOTAL PRINT LINE - HEADING CONTROL | | | | | | | | | | | ** | | * | 005950 |
| L00941 | UZ | . | | | | | | | | | | GRR15 | | 8 | | 005980 |
| N00991 | AN | N00981 | AN | N00971 | | | | | | | | D120502 | 120502 | | | 006000 |
| L00942 | | | | | | | | | | | | D009177 | 009177 | | | 006200 |
| N00942 | UZ | L00902 | - | 2 | | | | | | | | R120502 | | 5 | | 006300 |
| *** | | L00942 (CONTROL TOTALS ONLY) | | | | | | | | | | | | | * | 006310 |
| ** | | GROUP PRINT ONLY (00942) | | | | | | | | | | | ** | | * | 006490 |
| L00942 | | | | | | | | | | | | D00100000863 | 0 | | | 006500 |
| | UZ | 7 | | | | | | | | | | R101310 | | 2 | | 006600 |
| | UZ | IN N2. | | | | | | | | | | R101310 | | 5 | | 006700 |
| 1 6 | 7 8 | 9 14 | 15 16 | 17 22 | 23 24 | 25 30 | 31 32 | 33 38 | 39 40 | 41 55 | 56 | 57 58 | 59 64 | 65 70 | 71 72 | 73 77 |

FIG. 29

| OPERAND | OP | OPERAND | OP | OPERAND | OP | OPERAND | OP | OPERAND | CONT ON NEXT LINE | ACTION | BEGIN STMT NO | FIELD POSN OR END STMT NO | SEQ NO |
|---|---|---|---|---|---|---|---|---|---|---|---|---|---|
| 1 6 | 7 8 | 9 14 | 15 16 17 | 22 23 24 25 | 30 31 32 33 | 38 39 40 41 | 55 56 | 57 58 | 59 | 64 65 | 70 71 72 73 | 77 |
| *** | | TOTALS | TO BE PRINTED UNDER DETAIL COLUMNS | | | | | | | | | *** | *13839 |
| L00943 | | | | | | | | | | | D00866500866 5 | | 138400 |
| | | | | | | | | | | | 500867000867 0 | | 138500 |
| | | | | | | | | | | | D12052012054 0 | | 138600 |

FIG. 30

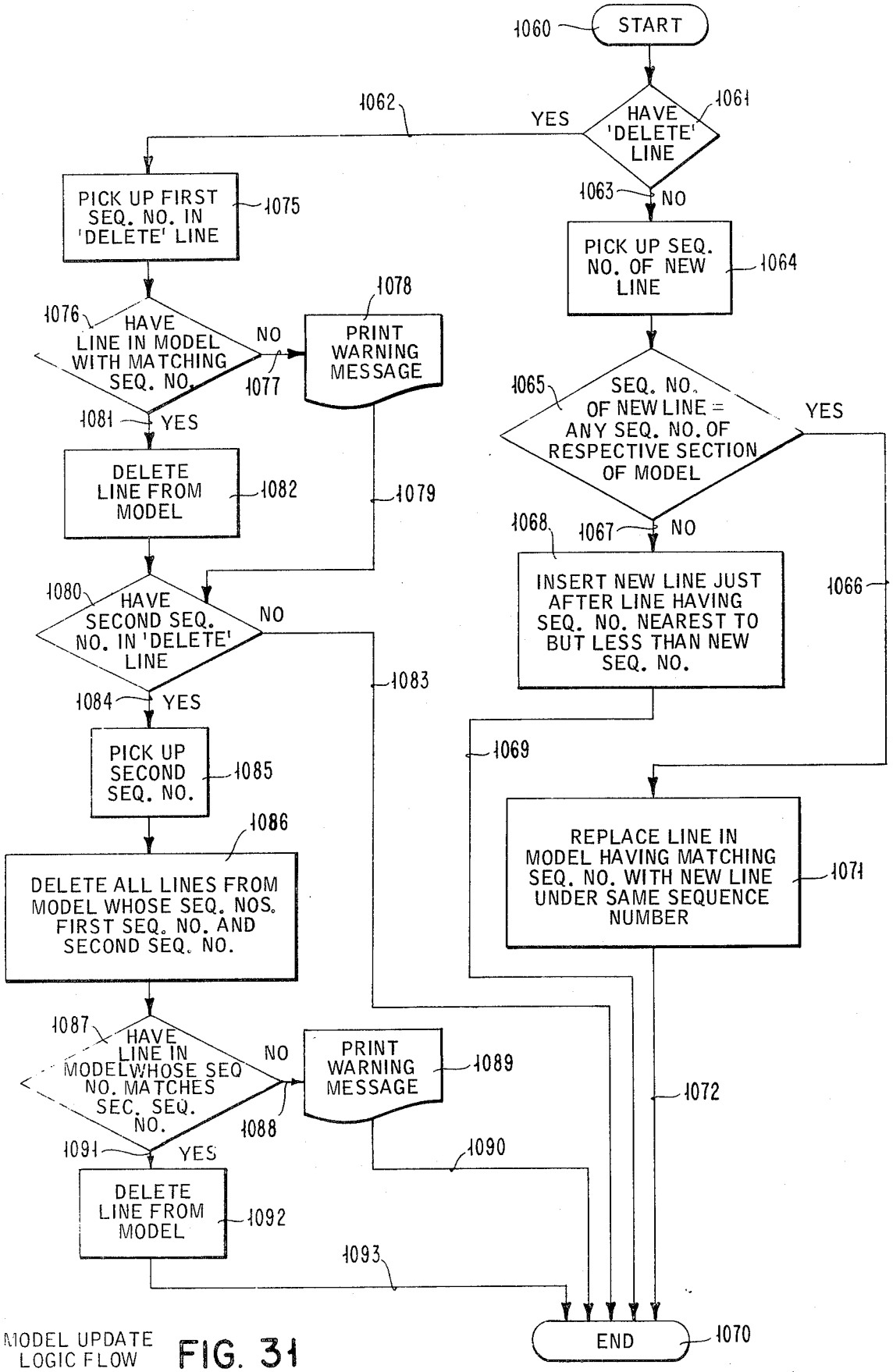
MODEL UPDATE LOGIC FLOW FIG. 31